United States Patent
Yoon et al.

(10) Patent No.: US 11,168,097 B2
(45) Date of Patent: *Nov. 9, 2021

(54) PHOTOCHEMICAL METHODS OF MAKING CYCLOBUTANE BORONATES AND RELATED COMPOUNDS

(71) Applicant: Wisconsin Alumni Research Foundation, Madison, WI (US)

(72) Inventors: Tehshik Peter Yoon, Madison, WI (US); Spencer Owen Scholz, Madison, WI (US); Rowan Mark Littlefield, Madison, WI (US); Niecia Elizabeth Flikweert, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,817

(22) Filed: Mar. 18, 2020

(65) Prior Publication Data

US 2020/0223870 A1    Jul. 16, 2020

Related U.S. Application Data

(63) Continuation of application No. 16/053,287, filed on Aug. 2, 2018, now Pat. No. 10,618,917.

(60) Provisional application No. 62/540,682, filed on Aug. 3, 2017.

(51) Int. Cl.
   *C07F 5/02* (2006.01)
   *B01J 19/12* (2006.01)

(52) U.S. Cl.
   CPC .............. *C07F 5/02* (2013.01); *B01J 19/127* (2013.01); *C07F 5/025* (2013.01); *B01J 2219/0892* (2013.01)

(58) Field of Classification Search
   CPC ......................................... C07F 5/02
   USPC ......................................... 549/213
   See application file for complete search history.

(56) References Cited

U.S. PATENT DOCUMENTS 10,618,917 B2 *    4/2020    Yoon ...................... B01J 19/127

OTHER PUBLICATIONS

Manuel Guisan-Ceinos et al. Enantioselective Synthesis of cyclobutylboronates via a Copper-Catalysed Desymmetrization approach (Year: 2016).*
Kaitlyn Logan et al , atalytic Enantioselective Arylboration of Alkenylarenes (Year: 2017).*
Kip-Teegardin et al., Advances in photocatalysis. (Year: 2016).
Michael Ischay et al., [2+2] cycloadditions by oxidative Visible Light photocatalysis. (Year: 2010).
Tae-Gon baik et al., A diastereoselective Metal Catalyzed [2+2] cycloaddition of Bis-enones. (Year: 2001).
Xun Liu et al., A Boron Alkylidene-Alkene Cycloaddition Reaction: Application to the synthesis of Aphanamal. (Year: 2017).
Yinghuai Zhu et al., Application of Cycloaddition reactions to the Syntheses of Novel Boron Compounds. (Year: 2010).

* cited by examiner

*Primary Examiner* — Rita J Desai
(74) *Attorney, Agent, or Firm* — Foley & Lardner LLP

(57) ABSTRACT

The present technology relates generally cyclobutane boronates, including methods of preparation by exposing a mixture of a compound of Formula I in a solvent

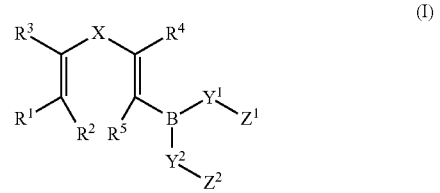

and a catalytic amount of a visible light sensitizer to provide a compound of Formula II, stereoisomers thereof, and/or salts of any of the foregoing.

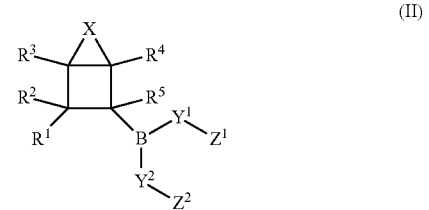

The cyclobutane boronate compounds are useful intermediates in the preparation of pharmaceutically active compounds as well as other useful compounds.

21 Claims, No Drawings

PHOTOCHEMICAL METHODS OF MAKING CYCLOBUTANE BORONATES AND RELATED COMPOUNDS

CROSS-REFERENCE TO RELATED APPLICATIONS

This application is a continuation application of U.S. patent application Ser. No. 16/053,287, filed Aug. 2, 2018, which claims the benefit of and priority to U.S. Provisional Patent Application No. 62/540,682, filed Aug. 3, 2017, the entire contents of both of which are incorporated herein by reference.

GOVERNMENT RIGHTS

This invention was made with government support under GM095666 awarded by the National Institutes of Health. The government has certain rights in the invention.

SUMMARY

The present technology provides new and mild methods for preparing functionalized cyclobutane boron compounds. While previous photochemical methods have sometimes led to increased side products and reduced yields of the desired cyclobutanes, the present methods are surprisingly accommodating to diverse and sensitive functionality in the reaction. Products such as boronated cyclobutanes and bi- or polycyclic butanes are useful intermediates that may be readily and rapidly converted to a variety of pharmaceutically active compounds or intermediates for the preparation of such compounds.

The methods include exposing a mixture of a compound of Formula I in a solvent

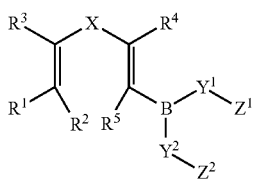

(I)

and a catalytic amount of a visible light photosensitizer to provide a compound of Formula II, stereoisomers thereof, and/or salts of any of the foregoing,

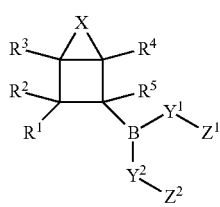

(II)

wherein
X is O, $NR^6$, S, $C_1$-$C_{12}$ alkylene or a $C_1$-$C_{12}$ heteroalkylene wherein the heteroatom is selected from O, $NR^6$, or S;
$Y^1$ and $Y^2$ are independently selected from O, $CR^7$; or $NR^7$; or $Y^1$ and $Y^2$ are both F and the boron atom forms a fluoride salt with a third fluorine atom and an alkali metal cation;
$Z^1$ and $Z^2$ are independently selected from a substituted or unsubstituted H or a substituted or unsubstituted $C_{1-12}$ alkyl, $C_{2-12}$ alkenyl, aryl, aralkyl, heteroaryl, or heteroaralkyl group, or
$Z^1$ and $Z^2$ together form Z, wherein Z is selected from a substituted or unsubstituted $C_2$-$C_{12}$ alkylene, $C_2$-$C_{12}$ heteroalkylene, or phenylene group;
$R^1$ is a substituted or unsubstituted alkenyl, alkynyl, aryl, or heteroaryl group;
$R^2$, $R^3$, $R^4$ and $R^5$ are each independently H or a substituted or unsubstituted alkyl group;
$R^6$ and $R^7$ at each occurrence are independently selected from H, a substituted or unsubstituted aryl or aralkyl group, or a $R^8SO_2$, $R^9OC(O)$, or $R^{10}C(O)$ group; and
$R^8$, $R^9$ and $R^{10}$ at each occurrence are independently selected from a substituted or unsubstituted alkyl, aryl, or aralkyl group.

Various visible light photosensitizers may be used in the present methods, including iridium(III) photosensitizers such as Ir(2',4'-dF-5-$CF_3$-ppy)$_2$(4,4'-dtb-bpy)$^+$, ruthenium (II) photosensitizers, and aryl ketones such as benzophenone. The catalytic amount of the visible light photosensitizer may be 0.025 mol %. to 5 mol % of the compound of Formula I. The wavelength of the visible light may be from 380 to 600 nm and the energy of the visible light may be 40 kcal/mol or higher photons. The present methods may be used to produce bicyclic cyclobutane compounds of Formula II, but may also be adapted for intermolecular reaction to provide monocyclic cyclobutanes.

DETAILED DESCRIPTION

In various aspects, the present technology provides methods of making cyclobutane boronates, including photochemical methods. The cyclobutane boronate compounds provided herein are facile intermediates for the rapid construction of functionalized cyclobutanes.

The following terms are used throughout the disclosure as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate the embodiments better and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Generally, reference to a certain element such as hydrogen or H is meant to include all isotopes of that element. For example, if an R group is defined to include hydrogen or H, it also includes deuterium and tritium. Compounds comprising radioisotopes such as tritium, $^{14}C$, $^{32}P$, and $^{35}S$ are thus within the scope of the present technology. Procedures for inserting such labels into the compounds of the present technology will be readily apparent to those skilled in the art based on the disclosure herein.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group is substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyl, heterocyclylalkyl, heterocyclyloxy, and heterocyclylalkoxy groups; carbonyls (oxo); carboxylates; esters; urethanes; oximes; hydroxylamines; alkoxyamines; aralkoxyamines; thiols; sulfides; sulfoxides; sulfones; sulfonyls; pentafluorosulfanyl (i.e., $SF_5$), sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Substituted ring groups such as substituted cycloalkyl, aryl, heterocyclyl and heteroaryl groups also include rings and ring systems in which a bond to a hydrogen atom is replaced with a bond to a carbon atom. Therefore, substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having (unless indicated otherwise) from 1 to 12 carbon atoms, and typically from 1 to 10 carbons or, in some embodiments, from 1 to 8, 1 to 6, or 1 to 4 carbon atoms. Alkyl groups may be substituted or unsubstituted. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above, and include without limitation haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Cycloalkyl groups may be substituted or unsubstituted. Exemplary monocyclic cycloalkyl groups include, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Bi- and tricyclic ring systems include both bridged cycloalkyl groups and fused rings, such as, but not limited to, bicyclo[2.1.1]hexane, adamantyl, decalinyl, and the like. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Cycloalkylalkyl groups are alkyl groups as defined above in which a hydrogen or carbon bond of an alkyl group is replaced with a bond to a cycloalkyl group as defined above. Cycloalkylalkyl groups may be substituted or unsubstituted. In some embodiments, cycloalkylalkyl groups have from 4 to 16 carbon atoms, 4 to 12 carbon atoms, and typically 4 to 10 carbon atoms. Substituted cycloalkylalkyl groups may be substituted at the alkyl, the cycloalkyl or both the alkyl and cycloalkyl portions of the group. Representative substituted cycloalkylalkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Alkenyl groups may be substituted or unsubstituted. Alkenyl groups have from 2 to 12 carbon atoms, and typically from 2 to 10 carbons or, in some embodiments, from 2 to 8, 2 to 6, or 2 to 4 carbon atoms. In some embodiments, the alkenyl group has one, two, or three carbon-carbon double bonds. Examples include, but are not limited to vinyl, allyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, among others. Representative substituted alkenyl groups may be mono-substituted or substituted more than once, such as, but not limited to, mono-, di- or tri-substituted with substituents such as those listed above.

Cycloalkenyl groups include cycloalkyl groups as defined above, having at least one double bond between two carbon atoms. Cycloalkenyl groups may be substituted or unsubstituted. In some embodiments the cycloalkenyl group may have one, two or three double bonds but does not include aromatic compounds. Cycloalkenyl groups have from 4 to 14 carbon atoms, or, in some embodiments, 5 to 14 carbon atoms, 5 to 10 carbon atoms, or even 5, 6, 7, or 8 carbon atoms. Examples of cycloalkenyl groups include cyclohexenyl, cyclopentenyl, cyclohexadienyl, cyclobutadienyl, and cyclopentadienyl.

Cycloalkenylalkyl groups are alkyl groups as defined above in which a hydrogen or carbon bond of the alkyl group is replaced with a bond to a cycloalkenyl group as defined above. Cycloalkenylalkyl groups may be substituted or unsubstituted. Substituted cycloalkenylalkyl groups may be substituted at the alkyl, the cycloalkenyl or both the alkyl and cycloalkenyl portions of the group. Representative substituted cycloalkenylalkyl groups may be substituted one or more times with substituents such as those listed above.

Alkynyl groups include straight and branched chain alkyl groups as defined above, except that at least one triple bond exists between two carbon atoms. Alkynyl groups may be substituted or unsubstituted. Alkynyl groups have from 2 to 12 carbon atoms, and typically from 2 to 10 carbons or, in some embodiments, from 2 to 8, 2 to 6, or 2 to 4 carbon atoms. In some embodiments, the alkynyl group has one, two, or three carbon-carbon triple bonds. Examples include, but are not limited to —C≡CH, —C≡CCH$_3$, —CH$_2$C≡CCH$_3$, —C≡CCH$_2$CH(CH$_2$CH$_3$)$_2$, among others. Representative substituted alkynyl groups may be monosubstituted or substituted more than once, such as, but not limited to, mono-, di- or tri-substituted with substituents such as those listed above.

Aryl groups are cyclic aromatic hydrocarbons that do not contain heteroatoms. Aryl groups may be substituted or unsubstituted. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups are phenyl or naphthyl. The phrase "aryl groups" includes groups containing fused rings, such as fused aromatic-aliphatic ring systems (e.g., indanyl, tetrahydronaphthyl, and the like). Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. Aralkyl groups may be substituted or unsubstituted. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above.

Heterocyclyl groups include aromatic (also referred to as heteroaryl) and non-aromatic ring compounds containing 3 or more ring members, of which one or more is a heteroatom such as, but not limited to, N, O, and S. Heterocyclyl groups may be substituted or unsubstituted. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass aromatic, partially unsaturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be mono-substituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, and S. Heteroaryl groups may be substituted or unsubstituted. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. The phrase "heteroaryl groups" includes fused ring compounds. Representative substituted heteroaryl groups may be substituted one or more times with various substituents such as those listed above.

Heterocyclylalkyl groups are alkyl groups as defined above in which a hydrogen or carbon bond of an alkyl group is replaced with a bond to a heterocyclyl group as defined above. Heterocyclylalkyl groups may be substituted or unsubstituted. Substituted heterocyclylalkyl groups may be substituted at the alkyl, the heterocyclyl or both the alkyl and heterocyclyl portions of the group. Representative heterocyclyl alkyl groups include, but are not limited to, morpholin-4-yl-ethyl, furan-2-yl-methyl, imidazol-4-yl-methyl, pyridin-3-yl-methyl, tetrahydrofuran-2-yl-ethyl, and indol-2-yl-propyl. Representative substituted heterocyclylalkyl groups may be substituted one or more times with substituents such as those listed above.

Heteroaralkyl groups are alkyl groups as defined above in which a hydrogen or carbon bond of an alkyl group is replaced with a bond to a heteroaryl group as defined above. Heteroaralkyl groups may be substituted or unsubstituted. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth. Substituted groups having a single point of attachment to the compound of the present technology are not referred to with the "ene" designation. Thus, e.g., chloroethyl is not referred to herein as chloroethylene.

Alkoxy groups are hydroxyl groups (—OH) in which the bond to the hydrogen atom is replaced by a bond to a carbon atom of a substituted or unsubstituted alkyl group as defined above. Alkoxy groups may be substituted or unsubstituted. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Representative substituted alkoxy groups may be substituted one or more times with substituents such as those listed above.

The terms "alkanoyl" and "alkanoyloxy" as used herein can refer, respectively, to —C(O)alkyl groups and —O—C(O)-alkyl groups, each containing 2-5 carbon atoms. Similarly, "aryloyl" and "aryloyloxy" refer to —C(O)-aryl groups and —O—C(O)-aryl groups.

The terms "aryloxy" and "arylalkoxy" refer to, respectively, a substituted or unsubstituted aryl group bonded to an oxygen atom and a substituted or unsubstituted aralkyl group bonded to the oxygen atom at the alkyl. Examples include but are not limited to phenoxy, naphthyloxy, and benzyloxy. Representative substituted aryloxy and arylalkoxy groups may be substituted one or more times with substituents such as those listed above.

The term "carboxylate" as used herein refers to a —C(O)OH group. The term "protected carboxylate" refers to —C(O)O-G groups, where G is a carboxylate protecting group. Carboxylate protecting groups are well known to one of ordinary skill in the art. An extensive list of protecting groups for the carboxylate group functionality may be found in Protective Groups in Organic Synthesis, Greene, T. W.; Wuts, P. G. M., John Wiley & Sons, New York, N.Y., (3rd Edition, 1999) which can be added or removed using the procedures set forth therein and which is hereby incorporated by reference in its entirety and for any and all purposes as if fully set forth herein.

The term "ester" as used herein refers to —COOR$^{70}$. R$^{70}$ is a substituted or unsubstituted alkyl, cycloalkyl, alkenyl, alkynyl, aryl, aralkyl, heterocyclylalkyl or heterocyclyl group as defined herein.

The term "amide" (or "amido") includes C- and N-amide groups, i.e., —C(O)NR$^{71}$R$^{72}$, and —NR$^{71}$C(O)R$^{72}$ groups, respectively. R$^{71}$ and R$^{72}$ are each independently hydrogen, or a substituted or unsubstituted alkyl, alkenyl, alkynyl, cycloalkyl, aryl, aralkyl, heterocyclylalkyl or heterocyclyl group as defined herein. Amido groups therefore include but are not limited to carbamoyl groups (—C(O)NH$_2$) and formamide groups (—NHC(O)H). In some embodiments, the amide is —NR$^{71}$C(O)—(C$_{1-5}$ alkyl) and the group is termed "carbonylamino," and in others the amide is —NHC(O)-alkyl and the group is termed "alkanoylamino."

The term "nitrile" or "cyano" as used herein refers to the —CN group.

Urethane groups include N- and O-urethane groups, i.e., —NR$^{73}$C(O)OR$^{74}$ and —OC(O)NR$^{73}$R$^{74}$ groups, respectively. R$^{73}$ and R$^{74}$ are each independently a substituted or unsubstituted alkyl, alkenyl, alkynyl, cycloalkyl, aryl, aralkyl, heterocyclylalkyl, or heterocyclyl group as defined herein. R$^{73}$ may also be H.

The term "amine" (or "amino") as used herein refers to —NR$^{75}$R$^{76}$ groups, wherein R$^{75}$ and R$^{76}$ are each independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is NH$_2$, methylamino, dimethylamino, ethylamino, diethylamino, propylamino, isopropylamino, phenylamino, or benzylamino.

The term "sulfonamido" includes S- and N-sulfonamide groups, i.e., —SO$_2$NR$^{78}$R$^{79}$ and NR$^{78}$SO$_2$R$^{79}$ groups, respectively. R$^{78}$ and R$^{79}$ are each independently hydrogen, or a substituted or unsubstituted alkyl, alkenyl, alkynyl, cycloalkyl, aryl, aralkyl, heterocyclylalkyl, or heterocyclyl group as defined herein. Sulfonamido groups therefore include but are not limited to sulfamoyl groups (—SO$_2$NH$_2$). In some embodiments herein, the sulfonamido is NHSO$_2$-alkyl and is referred to as the "alkylsulfonylamino" group.

The term "thiol" refers to —SH groups, while "sulfides" include —SR$^{80}$ groups, "sulfoxides" include —S(O)R$^{81}$ groups, "sulfones" include —SO$_2$R$^{82}$ groups, and "sulfonyls" include —SO$_2$OR$^{83}$. R$^{80}$, R$^{81}$, R$^{82}$, and R$^{83}$ are each independently a substituted or unsubstituted alkyl, cycloalkyl, alkenyl, alkynyl, aryl aralkyl, heterocyclyl or heterocyclylalkyl group as defined herein. In some embodiments the sulfide is an alkylthio group, —S-alkyl.

The term "urea" refers to —NR$^{84}$—C(O)—NR$^{85}$R$^{86}$ groups. R$^{84}$, R$^{85}$, and R$^{86}$ groups are each independently hydrogen, or a substituted or unsubstituted alkyl, alkenyl, alkynyl, cycloalkyl, aryl, aralkyl, heterocyclyl, or heterocyclylalkyl group as defined herein.

The term "amidine" refers to —C(NR$^{87}$)NR$^{88}$R$^{89}$ and —NR$^{87}$C(NR$^{88}$)R$^{89}$, wherein R$^{87}$, R$^{88}$, and R$^{89}$ are each independently hydrogen, or a substituted or unsubstituted alkyl, cycloalkyl, alkenyl, alkynyl, aryl aralkyl, heterocyclyl or heterocyclylalkyl group as defined herein.

The term "guanidine" refers to —NR$^{90}$C(NR$^{91}$)NR$^{92}$R$^{93}$, wherein R$^{90}$, R$^{91}$, R$^{92}$ and R$^{93}$ are each independently hydrogen, or a substituted or unsubstituted alkyl, cycloalkyl, alkenyl, alkynyl, aryl aralkyl, heterocyclyl or heterocyclylalkyl group as defined herein.

The term "enamine" refers to —C(R$^{94}$)=C(R$^{95}$)NR$^{96}$R$^{97}$ and —NR$^{94}$C(R$^{95}$)=C(R$^{96}$)R$^{97}$, wherein R$^{94}$, R$^{95}$, R$^{96}$ and R$^{97}$ are each independently hydrogen, a substituted or unsubstituted alkyl, cycloalkyl, alkenyl, alkynyl, aryl aralkyl, heterocyclyl or heterocyclylalkyl group as defined herein.

The term "halogen" or "halo" as used herein refers to bromine, chlorine, fluorine, or iodine. In some embodiments, the halogen is fluorine. In other embodiments, the halogen is chlorine or bromine.

The term "hydroxyl" as used herein can refer to —OH or its ionized form, —O$^-$. A "hydroxyalkyl" group is a hydroxyl-substituted alkyl group, such as HO—CH$_2$—.

The term "imide" refers to —C(O)NR$^{98}$C(O)R$^{99}$, wherein R$^{98}$ and R$^{99}$ are each independently hydrogen, or a substituted or unsubstituted alkyl, cycloalkyl, alkenyl, alkynyl, aryl aralkyl, heterocyclyl or heterocyclylalkyl group as defined herein.

The term "imine" refers to —CR$^{100}$(NR$^{101}$) and —N(CR$^{100}$R$^{101}$) groups, wherein R$^{100}$ and R$^{101}$ each independently hydrogen or a substituted or unsubstituted alkyl, cycloalkyl, alkenyl, alkynyl, aryl aralkyl, heterocyclyl or heterocyclylalkyl group as defined herein, with the proviso that R$^{100}$ and R$^{101}$ are not both simultaneously hydrogen.

The term "nitro" as used herein refers to an —NO$_2$ group.

The term "trifluoromethyl" as used herein refers to —CF$_3$.

The term "trifluoromethoxy" as used herein refers to —OCF$_3$.

The term "azido" refers to —N$_3$.

The term "trialkyl ammonium" refers to a —N(alkyl)$_3$ group. A trialkylammonium group is positively charged and thus typically has an associated anion, such as halogen anion.

The term "isocyano" refers to —NC.

The term "isothiocyano" refers to —NCS.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

Salts of compounds described herein are within the scope of the present technology and include acid or base addition salts so long as they are stable enough to be used for their intended purpose. When the compound of the present technology has a basic group, such as, for example, an amino group, acceptable salts can be formed with inorganic acids (such as hydrochloric acid, hydroboric acid, nitric acid, sulfuric acid, and phosphoric acid), organic acids (e.g. alginate, formic acid, acetic acid, benzoic acid, gluconic acid, fumaric acid, oxalic acid, tartaric acid, lactic acid, maleic acid, citric acid, succinic acid, malic acid, methanesulfonic acid, benzenesulfonic acid, naphthalene sulfonic acid, and p-toluenesulfonic acid) or acidic amino acids (such as aspartic acid and glutamic acid). When the compound of the present technology has an acidic group, such as for example, a carboxylic acid group, it can form salts with metals, such as alkali and earth alkali metals (e.g. Na$^+$, Li$^+$, K$^+$, Ca$^{2+}$, Zn$^{2+}$), ammonia or organic amines (e.g. dicyclohexylamine, trimethylamine, triethylamine, pyridine, picoline, ethanolamine, diethanolamine, triethanolamine) or basic amino acids (e.g. arginine, lysine and ornithine). Such salts can be prepared in situ during isolation and purification of the compounds or by separately reacting the purified compound in its free base or free acid form with a suitable acid or base, respectively, and isolating the salt thus formed.

Those of skill in the art will appreciate that compounds of the present technology may exhibit the phenomena of tautomerism, conformational isomerism, geometric isomerism and/or stereoisomerism. As the formula drawings within the specification and claims can represent only one of the possible tautomeric, conformational isomeric, stereochemical or geometric isomeric forms, it should be understood that the present technology encompasses any tautomeric, conformational isomeric, stereochemical and/or geometric isomeric forms of the compounds having one or more of the utilities described herein, as well as mixtures of these various different forms.

"Tautomers" refers to isomeric forms of a compound that are in equilibrium with each other. The presence and concentrations of the isomeric forms will depend on the environment the compound is found in and may be different depending upon, for example, whether the compound is a solid or is in an organic or aqueous solution. For example, in aqueous solution, quinazolinones may exhibit the following isomeric forms, which are referred to as tautomers of each other:

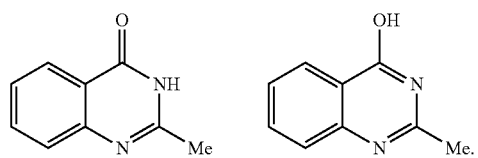 [SMILES: Cc1nc2ccccc2c(=O)[nH]1 ; Cc1nc(O)c2ccccc2n1]

As another example, guanidines may exhibit the following isomeric forms in protic organic solution, also referred to as tautomers of each other:

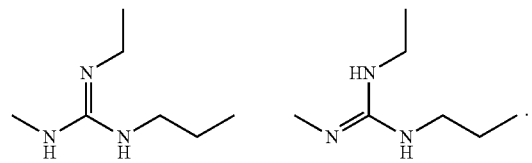

Because of the limits of representing compounds by structural formulas, it is to be understood that all chemical formulas of the compounds described herein represent all tautomeric forms of compounds and are within the scope of the present technology.

Stereoisomers of compounds (also known as optical isomers) include all chiral, diastereomeric, and racemic forms of a structure, unless the specific stereochemistry is expressly indicated. Thus, compounds used in the present technology include enriched or resolved optical isomers at any or all asymmetric atoms as are apparent from the depictions. Both racemic and diastereomeric mixtures, as well as the individual optical isomers can be isolated or synthesized so as to be substantially free of their enantiomeric or diastereomeric partners, and these stereoisomers are all within the scope of the present technology.

Compounds of the present technology may exist as hydrates. Hydrates may form during manufacture of the compounds or compositions comprising the compounds, or hydrates may form over time due to the hygroscopic nature of the compounds. Identification and preparation of any particular hydrate is within the skill of the person having ordinary skill in the art.

Thus, in one aspect, the present technology provides methods of making cyclobutane boronates. In one aspect, the methods include exposing a mixture of a compound of Formula I in a solvent (such as an organic solvent)

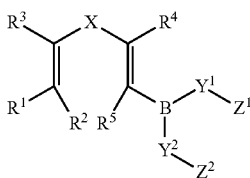

(I)

and a catalytic amount of a visible light photosensitizer to provide a compound of Formula II, stereoisomers thereof, and/or salts of any of the foregoing,

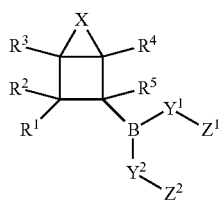

(II)

wherein

X is O, NR$^6$, S, C$_1$-C$_{12}$ alkylene or a C$_1$-C$_{12}$ heteroalkylene wherein the heteroatom is selected from O, NR$^6$, or S;

Y$^1$ and Y$^2$ are independently selected from O, CR$^7{}_2$, or NR$^7$; or Y$^1$ and Y$^2$ are both F and the boron atom forms a fluoride salt with a third fluorine atom and an alkali metal cation;

Z$^1$ and Z$^2$ are independently selected from H or a substituted or unsubstituted C$_{1-12}$ alkyl, C$_{2-12}$ alkenyl, aryl, aralkyl, heteroaryl, or heteroaralkyl group, or Z$^1$ and Z$^2$ together form Z, wherein Z is selected from a substituted or unsubstituted C$_2$-C$_{12}$ alkylene, C$_2$-C$_{12}$ heteroalkylene, or phenylene group; or Z$^1$ and Z$^2$ are absent when Y$^1$ and Y$^2$ are both F;

R$^1$ is a substituted or unsubstituted alkenyl, alkynyl, aryl, or heteroaryl group;

R$^2$, R$^3$, R$^4$ and R$^5$ are each independently H or a substituted or unsubstituted alkyl group;

R$^6$ and R$^7$ at each occurrence are independently selected from H, a substituted or unsubstituted aryl or aralkyl group, or a R$^8$SO$_2$, R$^9$OC(O), or R$^{10}$C(O) group; and R$^8$, R$^9$ and R$^{10}$ at each occurrence are independently selected from a substituted or unsubstituted alkyl, aryl, or aralkyl group.

In some embodiments of the methods of making cyclobutane boronates, X is O and in others, X is NR$^6$. In other embodiments, X is —(CR$^{11}{}_2$)$_n$—O—(CR$^{11}{}_2$)$_p$—, —(CR$^{11}{}_2$)$_n$—NR$^{12}$—(CR$^{11}{}_2$)$_p$— or a C$_3$-C$_4$ alkylene group, R$^{11}$ at each occurrence and R$^{12}$ are independently H or C$_{1-6}$ alkyl, and each of n and p is independently 1 or 2. In some embodiments, n+p is not more than 3. In some embodiments X is —(CH$_2$)$_n$—O—(CH$_2$)$_p$—, e.g., —CH$_2$—O—CH$_2$—. In certain embodiments where X is or includes NR$^6$, the R$^6$ may be a phenyl or benzyl group or an R$^8$SO$_2$ group.

In some embodiments of the present methods, Y$^1$ and Y$^2$ are both O, or both NR$^7$. In some embodiments where one or both Y$^1$ and Y$^2$ are NR$^7$, R$^7$ may be a phenyl or benzyl group or a R$^8$SO$_2$ group. In some embodiments, Y$^1$ and Y$^2$ are both CR$^7{}_2$, e.g., CH$_2$— or CH(CH$_3$).

In certain embodiments of the present methods, Z$^1$ and Z$^2$ together form Z which is an unsubstituted phenylene or C$_2$-C$_6$ alkylene group or is —(CH$_2$)$_{1-2}$—NH—(CH$_2$)$_{1-2}$—. In some embodiments, Z$^1$ and Z$^2$ are independently H or C$_{1-6}$ alkyl. In still other embodiments Y$^1$ and Y$^2$ are both O and Z$^1$ and Z$^2$ are independently H or C$_{1-6}$ alkyl. In some embodiments, Y$^1$ and Y$^2$ are both CR$^7{}_2$ (e.g., CH$_2$) and Z$^1$ and Z$^2$ are independently C$_{1-6}$ alkyl.

In some embodiments of the present methods, R$^1$ is unsubstituted C$_2$-C$_6$ alkenyl. In other embodiments, R$^1$ is a substituted or unsubstituted aryl or heteroaryl group. For example R$^1$ may be a substituted or unsubstituted phenyl or furanyl group. In still other embodiments, R$^1$ is a C$_1$-C$_6$ alkyl group.

In some embodiments of the present methods, R$^2$ is H or a C$_1$-C$_6$ alkyl group.

In some embodiments of the present methods, R$^3$ and R$^4$ are both H.

In some embodiments of the present methods, R$^5$ is H or a unsubstituted C$_1$-C$_6$ alkyl group.

In certain embodiments R$^8$, R$^9$ and R$^{10}$ at each occurrence are independently selected from a substituted or unsubstituted C$_{1-6}$ alkyl, phenyl, benzyl or phenethyl group. In some embodiments, R$^8$, R$^9$ and R$^{10}$ at each occurrence are independently selected from an unsubstituted C$_{1-6}$ alkyl, phenyl, benzyl or phenethyl group.

In certain embodiments of the present methods, the compound of Formula II has the structure of Formula IIA:

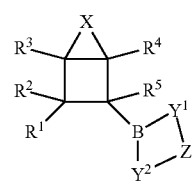

(IIA)

wherein

X is O, NR$_6$, S, C$_1$-C$_4$ alkylene or a C$_1$-C$_3$ heteroalkylene wherein the heteroatom is selected from O, NR$_6$ and S;

Y$^1$ and Y$^2$ are independently selected from O, CR$^7{}_2$, or NR$^7$;

Z is a substituted or unsubstituted C$_2$-C$_6$ alkylene, C$_2$-C$_6$ heteroalkylene or phenylene group;

R$^1$ is a substituted or unsubstituted alkenyl, alkynyl, aryl, or heteroaryl group;

R$^2$, R$^3$, R$^4$ and R$^5$ are each independently H or a substituted or unsubstituted alkyl group;

R$^6$ and R$^7$ are independently selected from a substituted or unsubstituted aryl or aralkyl group, or a R$^8$SO$_2$, R$^9$OC(O), or R$^{10}$C(O) group; and R$^8$, R$^9$ and R$^{10}$ at each occurrence are independently selected from a substituted or unsubstituted alkyl, aryl, or aralkyl group.

A "visible light photosensitizer" of the present technology is an organic or organometallic complex that, when exposed to visible light (e.g., light having wavelengths between 380 and 700 nm) causes formation of a triplet state in dienes of the present technology (e.g., compounds of Formula I). A "catalytic amount" of the visible light photosensitizer is an amount sufficient to speed up, facilitate or even make possible the production of cyclobutane boronates (e.g., compounds of Formula II) from suitable diene boronates (e.g., compounds of Formula I). In some embodiments the visible light sensitizer is an iridium(III) photosensitizer or a ruthenium(II) photosensitizer. In others, the visible light sensitizer is an aromatic ketone, e.g., benzophenone, xanthone, and thioxanthone. Typically, but not necessarily, the catalytic amount of visible light sensitizer is a fraction of the molar amount of reactant diene (e.g., compound of Formula I). In some embodiments, the catalytic amount of visible light photosensitizer may be 0.025 mol % to 5 mol % based on the amount of diene reactant, e.g., 0.025 mol % to 5 mol % of Ir(III) or Ru(II) photosensitizer. In some embodiments, the catalytic amount of photosensitizer is 0.025, 0.1, 0.2, 0.3, 0.4, 0.5, 0.6, 0.8, 1.0, 1.2, 1.25, 1.5, 1.75, 2.0, 2.5, 3.0, 3.5, 4, 4.5, or 5 mol % of the diene reactant or a range between and including any of the foregoing values.

Iridium(III) photosensitizers that may be used in the present technology include complexes with three or more ligands selected from phenyl pyridine (ppy) and derivatives thereof such as fluorophenyl pyridine (e.g., 4'-F-ppy), difluorophenyl pyridine (e.g., 2',4'-dF-ppy), trifluourophenyl pyridine (e.g., 4'-CF$_3$-ppy), ditertbutyl bipyridine (e.g., 4,4'-dtb-bpy), difluoro-trifluromethyl phenylpyridine (e.g., 2',4'-dF-5-CF$_3$-ppy), and difluoromethyl phenylpyridine (e.g., 2',4'-dF-5-me-ppy). For example, the iridium(III) photosensitizer may be fac-Ir(ppy)$_3$, fac-Ir(2',4'-dF-ppy)$_3$, fac-Ir(4'-F-ppy)$_3$, fac-Ir(4'-CF3-ppy)$_3$, [Ir(ppy)$_2$((4,4'-dtb-bpy)n]$^+$, [Ir(2',4'-dF-5-CF$_3$-ppy)$_2$(bpy)]$^+$, [Ir(2',4'-dF-5-me-ppy)$_2$(4,4'-dtb-bpy)]$^+$, [Ir(2',4'-dF-5-CF$_3$-ppy)$_2$(4,4'-dtb-bpy)]$^+$. Positively charged Ir(III) complexes may be any suitable salt such as PF$_6$ salts. In certain embodiments the iridium(III) photosensitizer is [Ir(2',4'-dF-5-CF$_3$-ppy)$_2$(4,4'-dtb-bpy)]$^+$, e.g., [Ir(2',4'-dF-5-CF$_3$-ppy)$_2$(4,4'-dtb-bpy)]PF$_6$.

Ruthenium(II) photosensitizers that may be used in the present technology include complexes with three or more ligands selected from ditertbutyl bipyridine (e.g., 4,4'-dtb-bpy), such as [Ru(dtb-bpy)$_3$](PF$_6$)$_2$).

In the present methods, a wide variety of solvents or solvent mixtures may be used without significantly affecting the reaction. Typically, an organic solvent is used such as dichloromethane, DMSO, DMF, acetone, methanol, THF, ether, hexanes or a mixture of any two or more thereof. In addition, water or mixtures of water and organic solvents may be used.

The use of visible light is an advantage of the present technology because, being less energetic than, e.g., ultraviolet light, fewer side reactions occur. While not wishing to be bound by theory, it is believed that the visible light must still be energetic enough to cause formation of the triplet state in the photosensitizer. The energy of the visible light is typically at least 40 kcal/mol photons, e.g., about 40, 45, 50, 55, 65, or 71 kcal/mol photons to about 75 kcal/mol photons, or a range between and including any two of the foregoing values. In some embodiments the energy of the visible light is about 40-50 kcal/mol photons, and in others it is about 50 to 75 kcal/mol photons. The visible light may have any suitable wavelength that provides enough energy to form the triplet state in the photosensitizer used. For example, the wavelength of visible light may be 380 to 600 nm, including 380, 400, 425, 450, 500, 550, or 600 nm, or a range between and including any two of the foregoing values.

Although a range of concentrations of the compound of Formula I may be used, concentrations less than or equal to 0.1 M provide higher yields of the cyclized product. For example the concentration of the compound of Formula I may range from 0.0001M to 0.1 M. In some embodiments the concentration range is less than or equal to 0.05 M or even less than or equal to 0.01 M. In some embodiments the concentration of the compound of Formula I is 0.0001 M, 0.001 M, 0.005 M, 0.01 M, 0.05 M or 0.1M or a range between and including any two of the foregoing values.

In another aspect, the present technology provides an intermolecular method comprising exposing a mixture of a compound of Formula III and a compound of Formula IV in a solvent

(III)

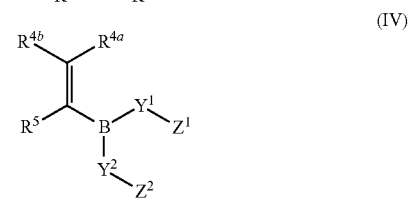

(IV)

and a catalytic amount of a visible light photosensitizer to provide a compound of Formula IV, stereoisomers thereof, and/or salts of any of the foregoing, wherein R$^1$, R$^2$, R$^5$, Y$^1$, Y$^2$, Z$^1$, and Z$^2$ may be defined as herein; and R$^{3a}$, R$^{3b}$, R$^{4a}$, R$^{4b}$ are each independently H or a substituted or unsubstituted alkyl group; or R$^{3a}$ and R$^1$ together form an aryl group, e.g., 1H-indene.

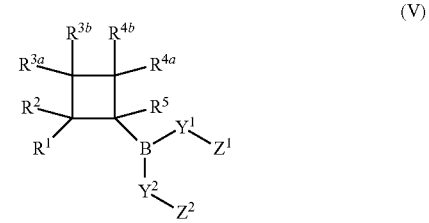

(V)

In another aspect, the present technology provides a compound of Formula II or a stereoisomer thereof, and/or salt thereof:

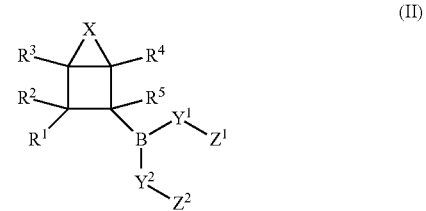

(II)

wherein

X is O, NR$^6$, S, C$_1$-C$_{12}$ alkylene or a C$_1$-C$_{12}$ heteroalkylene wherein the heteroatom is selected from O, NR$^6$, or S;

Y$^1$ and Y$^2$ are independently selected from O, CR$^7$$_2$, or NR$^7$; or Y$^1$ and Y$^2$ are both F and the boron atom forms a fluoride salt with a third fluorine atom and an alkali metal cation;

Z$^1$ and Z$^2$ are independently selected from a substituted or unsubstituted H or a substituted or unsubstituted C$_{1-12}$ alkyl, C$_{2-12}$ alkenyl, aryl, aralkyl, heteroaryl, or heteroaralkyl group, or Z$^1$ and Z$^2$ together form Z, wherein Z is selected from a substituted or unsubstituted C$_2$-C$_{12}$ alkylene, C$_2$-C$_{12}$ heteroalkylene, or phenylene group;

$R^1$ is a substituted or unsubstituted alkenyl, alkynyl, aryl, or heteroaryl group;

$R^2$, $R^3$, $R^4$ and $R^5$ are each independently H or a substituted or unsubstituted alkyl group;

$R^6$ and $R^7$ at each occurrence are independently selected from H, a substituted or unsubstituted aryl or aralkyl group, or a $R^8SO_2$, $R^9OC(O)$, or $R^{10}C(O)$ group; and $R^8$, $R^9$ and $R^{10}$ at each occurrence are independently selected from a substituted or unsubstituted alkyl, aryl, or aralkyl group.

In some embodiments of the compounds of Formula II, X is O and in others, X is $NR^6$. In other embodiments, X is $-(CR^{11}_2)_n-O-(CR^{11}_2)_p-$, $-(CR^{11}_2)_n-NR^{12}-(CR^{11}_2)_p-$ or a $C_3$-$C_4$ alkylene group, $R^{11}$ at each occurrence and $R^{12}$ are independently H or $C_{1-6}$ alkyl, and each of n and p is independently 1 or 2. In some embodiments, n+p is not more than 3. In some embodiments X is $-(CH_2)_n-O-(CH_2)_p-$, e.g., $-CH_2-O-CH_2-$. In certain embodiments where X is $NR^6$, the $R^6$ may be a phenyl or benzyl group or an $R^8SO_2$ group.

In some embodiments of the compounds of Formula II, $Y^1$ and $Y^2$ are both O, or both $NR^7$. In some embodiments where one or both $Y^1$ and $Y^2$ are $NR^7$, $R^7$ may be a phenyl or benzyl group or a $R^8SO_2$ group. In some embodiments, $Y^1$ and $Y^2$ are both $CR^7_2$, e.g., $CH_2-$ or $CH(CH_3)$.

In certain embodiments of the present methods, $Z^1$ and $Z^2$ together form Z which is an unsubstituted phenylene or $C_2$-$C_6$ alkylene group or is $-(CH_2)_{1-2}-NH-(CH_2)_{1-2}-$. In some embodiments, $Z^1$ and $Z^2$ are independently H or $C_{1-6}$ alkyl. In still other embodiments $Y^1$ and $Y^2$ are both O and $Z^1$ and $Z^2$ are independently H or $C_{1-6}$ alkyl. In some embodiments, $Y^1$ and $Y^2$ are both $CR^7_2$ (e.g., $CH_2$) and $Z^1$ and $Z^2$ are independently $C_{1-6}$ alkyl.

In some embodiments of the present compounds, $R^1$ is unsubstituted $C_2$-$C_6$ alkenyl. In other embodiments, $R^1$ is a substituted or unsubstituted aryl or heteroaryl group. For example $R^1$ may be a substituted or unsubstituted phenyl or furanyl group. In still other embodiments, $R^1$ is a $C_1$-$C_6$ alkyl group.

In some embodiments of the present compounds, $R^2$ is H or a $C_1$-$C_6$ alkyl group.

In some embodiments of the present compounds, $R^3$ and $R^4$ are both H.

In some embodiments of the present compounds, $R^5$ is H or unsubstituted $C_1$-$C_6$.

In certain embodiments $R^8$, $R^9$ and $R^{10}$ at each occurrence are independently selected from a substituted or unsubstituted $C_{1-6}$ alkyl, phenyl, benzyl or phenethyl group. In some embodiments, $R^8$, $R^9$ and $R^{10}$ at each occurrence are independently selected from an unsubstituted $C_{1-6}$ alkyl, phenyl, benzyl or phenethyl group.

In certain embodiments of the present technology, the compound of Formula II has the structure of Formula IIA:

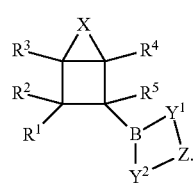

(IIA)

The $R^1$-$R^5$ variables of Formula IIA may have any of the values described herein for Formula II or may be defined as follows along with Z, $Y^1$ and $Y^2$:

X is O, $NR_6$, S, $C_1$-$C_4$ alkylene or a $C_1$-$C_3$ heteroalkylene wherein the heteroatom is selected from O, $NR_6$ and S;

$Y^1$ and $Y^2$ are independently selected from O, $CR^7_2$, or $NR^7$;

Z is a substituted or unsubstituted $C_2$-$C_6$ alkylene, $C_2$-$C_6$ heteroalkylene or phenylene group;

$R^1$ is a substituted or unsubstituted alkenyl, alkynyl, aryl, or heteroaryl group;

$R^2$, $R^3$, $R^4$ and $R^5$ are each independently H or a substituted or unsubstituted alkyl group;

$R^6$ and $R^7$ are independently selected from a substituted or unsubstituted aryl or aralkyl group, or a $R^8SO_2$, $R^9OC(O)$, or $R^{10}C(O)$ group; and $R^8$, $R^9$ and $R^{10}$ at each occurrence are independently selected from a substituted or unsubstituted alkyl, aryl, or aralkyl group.

The examples herein are provided to illustrate advantages of the present technology and to further assist a person of ordinary skill in the art with preparing or using the compounds of the present technology, compositions, derivatives, racemic mixtures or tautomeric forms thereof. Examples herein are also presented in order to more fully illustrate the preferred aspects of the present technology. These examples should in no way be construed as limiting the scope of the present technology, as defined by the appended claims. The examples can include or incorporate any of the variations, aspects or embodiments of the present technology described above. The variations, aspects or aspects described above may each also include or incorporate the variations of any or all other variations, aspects or embodiments of the present technology.

EXAMPLES

Example 1: Preparation of Diene Precursors

Except where indicated, the precursor compounds to the diene boronates were made by the two following general procedures.

Route 1

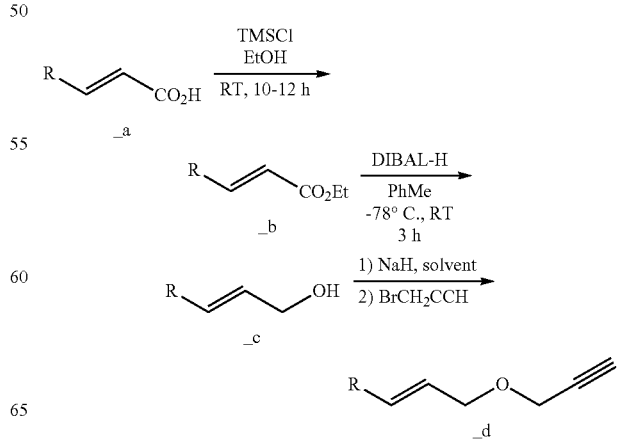

-continued

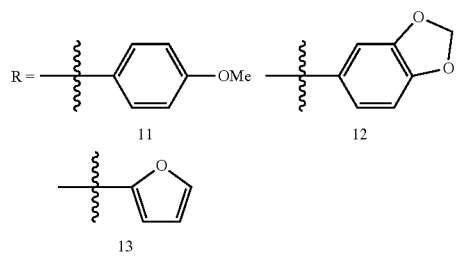

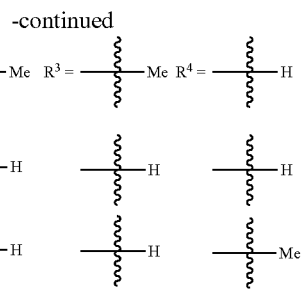

The first two steps were carried out according to literature procedures while the general procedure for the Williamson ether synthesis (WES) was the following: To a stirring suspension of sodium hydride (1.5 eq) in THF under an atmosphere of nitrogen was added alcohol c (1 eq) predissolved in THF. The mixture was cooled to 0° C. for 15 minutes. An 80% v/v solution of propargyl bromide (1.5 eq) in toluene was added and the reaction was allowed to warm to rt while monitoring consumption of the starting material by TLC. Upon completion, the reaction was quenched via addition of saturated NH$_4$Cl (aq) solution. The aqueous and organic layers were separated and the aqueous layer was extracted with diethyl ether (3×). The organic layers were combined, dried over MgSO$_4$, filtered, and then concentrated in vacuo. The product was then purified via silica gel chromatography.

Route 2

The first two steps were carried out according to literature procedures, while the WES was conducted using the same procedure used in route 1.

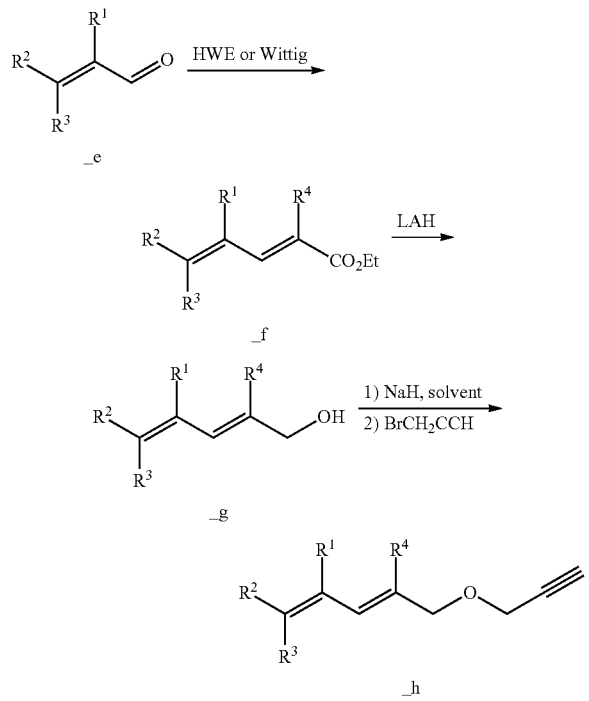

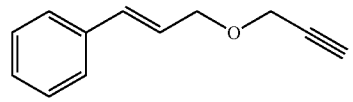

(E)-(3-(prop-2-yn-1-yloxy)prop-1-en-1-yl)benzene (10h): Prepared using a procedure by Liu.[1] Into an oven-dried vial was placed 60% NaH dispersion in oil (1.076 g, 1.2 mmol) followed by 30 mL THF. This was cooled to 0° C. for 20 min. To this was added cinnamyl alcohol (3.0006 g) proparagyl bromide (3 mL, 39.8 mmol). This was stirred for ~20 h. The reaction mixture was quenched with DI H$_2$O in an ice bath, extracted with Et$_2$O 3×. The organic layers were then washed with Brine, dried with MgSO$_4$, combined and concentrated. The compound was purified by FCC with 10:1 hexanes: EtOAc as the eluent. The compound was a dark orange colored oil (3.1365 g, 18.2 mmol, 81%). The $^1$NMR (400 MHz, CDCl$_3$) spectrum is consistent with the literature precedent.

11d (E)-1-methoxy-4-[3-(prop-2-yn-1-yloxy) prop-1-en-1-yl] benzene (11d): Made via route 1, starting from the carboxylic acid 11a. The first two steps were carried out according to a literature procedure, and the $^1$H-NMR spectra of the products were consistent with those which were reported.[2] For the first step, 180 mg of carboxylic acid 11a, was combined with 0.270 mL of TMSCl in 5 mL of ethanol, and the product ester 11b was obtained in 94% yield (193 mg). The subsequent reduction step was carried out using 193 mg of ester 11b, 2.1 mL of 1M DIBAL-H in hexanes, and 2.3 mL of toluene. The product was purified using a 3:7 ethyl acetate/ hexanes and the isolated yield was 64% (98.5 mg). The WES was carried out using 95.5 mg of alcohol 11c dissolved in 1.5 mL of THF, 38.2 mg of sodium hydride suspended in 1.2 mL of THF, and 0.10 mL of propargyl bromide solution. The reaction was quenched with 1.7 mL of sat. NH$_4$Cl (aq) solution and the product was isolated as a colorless liquid using 1:10 ethyl acetate/ hexanes eluent in 81% yield (95.5 mg). The observed $^1$H-NMR spectrum was consistent with that which is reported in the literature.[3]

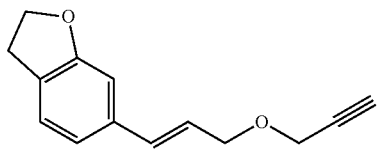

12d (E)-3-[(3,4-methylenedioxy)phenyl]prop-2-en-1-ylpropargyl oxide (12d): Made via route 1, starting from the alcohol 12c, and the ¹H-NMR spectra of the products were consistent with those which were reported.[2] The WES was carried out using 715 mg of alcohol 12c dissolved in 10.3 mL of THF, 281.5 mg of sodium hydride suspended in 8.2 mL of THF, and 0.67 mL of propargyl bromide solution. The reaction was quenched with 12 mL of sat. NH₄Cl (aq) solution and the product was isolated using 1:10 ethyl acetate/hexanes eluent in 82% yield (715.5 mg) as a light green liquid. The observed ¹H-NMR spectrum was consistent with that which is reported in the literature.[4]

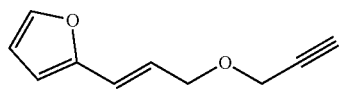

13d (E)-2-(3-(prop-2-yn-1-yloxy)prop-1-en-1-yl) furan (13d): Made via route 1, starting from the carboxylic acid 13a. The first two steps were carried out according to a literature procedure, and the ¹H-NMR spectra of the products were consistent with those which were reported.[2] For the first step, 1.38 g of carboxylic acid 11a, was combined with 2.79 mL of TMSCl in 50 mL of ethanol, and the product ester 11b was obtained in 89% yield (1.48 g). The subsequent reduction step was carried out using 1.48 g of ester 11b, 5.64 mL of 1M DIBAL-H in hexanes, and 23.5 mL of toluene. The product was purified using a 1:2 diethyl ether/pentanes and the isolated yield was 51% (572.9 mg). The WES was carried out using 572.9 mg of alcohol 11c dissolved in 12 mL of THF, 294.9 mg of sodium hydride suspended in 8.6 mL of THF, and 0.70 mL of propargyl bromide solution. The reaction was quenched with 14 mL of sat. NH₄Cl (aq) solution and the product was isolated as a colorless liquid using 1:10 ethyl acetate/hexanes eluent in 77% yield (574.6 mg). The observed ¹H-NMR spectrum was consistent with that which is reported in the literature.[1]

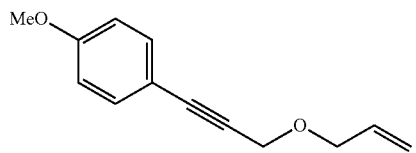

14h 1-(3-allyloxy-prop-1-ynyl)-4-methoxy-benzene (18h): Alkyne 18h was prepared via literature precedent from the corresponding alcohol and allyl bromide using a literature precedent.[5]

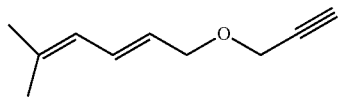

15h (2E)-1-(prop-2-ynyloxy)-5-methyl-hexa-2,4-diene (15h): Made via route 2, starting from aldehyde 15e. Ester 15f prepared from 15e via HWE reaction using a literature precedent,[6] while alcohol 15f was prepared from 15e using another literature precedent.[7] The WES was carried out using 121.1 mg of alcohol 15e dissolved in 7 mL of THF, 203.5 mg of sodium hydride suspended in 3 mL of THF, and 0.56 mL of propargyl bromide solution. The reaction was quenched with 5 mL of sat. NH₄Cl (aq) solution and the product was isolated as a colorless liquid using 1:10 ethyl acetate/ hexanes eluent. Product carried forward assuming 100% yield, while the actual yield determination was made following the hydroboration. The observed ¹H-NMR spectrum was consistent with that which is reported in the literature.[8]

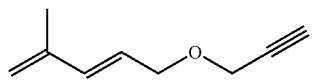

16h 4,4,5,5-tetramethyl-2-((E)-3-(((E)-4-methylpenta-2,4-dien-1-yl) oxy)prop-1-en1-yl)-1,3,2-dioxaborolane (16h): Made via route 2, starting from aldehyde 16e. Ester 16f prepared from 16e via Wittig reaction, while alcohol 16f prepared from 16e using a literature precedent.[9] The WES was carried out using 129.6 mg of alcohol 16e dissolved in 1.9 mL of THF, 137.2 mg of sodium hydride suspended in 2.6 mL of THF, and 0.3 mL of propargyl bromide solution. The reaction was quenched with 5 mL of sat. NH₄Cl (aq) solution and the product was isolated as a colorless liquid using 1:20 diethyl ether/pentanes eluent in 33% yield. ¹NMR (500 MHz, CDCl₃) δ 6.37 (d, 16.4 Hz, 1H), δ 5.73 (dt, 16.5, 5.6 Hz, 1H), δ 5.01 (d, 1.4 Hz, 1H), δ 5.00 (d, 0.9 Hz, 1H), δ 4.16 (d, 2.4 Hz, 2H), δ 4.15 (dd, 6.4, 1.4 Hz, 2H), δ 2.44 (t, 2.3 Hz, 1H), δ 1.86 (s, 1.6 Hz, 3H).

17h 2-((E)-3-(((E)-2,4-dimethylpenta-2,4-dien-1-yl)oxy) prop-1-en-1-yl)-4,4,5,5tetramethyl-1,3,2-dioxaborolane (17h): Made via route 2, starting from aldehyde 17e. Ester 17f prepared from 17e using a literature precedent,[10] while alcohol 17f prepared from 17e using another literature precedent.[11] The WES was carried out using 986 mg of alcohol 17e dissolved in 9 mL of THF, 527.4 mg of sodium hydride suspended in 12 mL of THF, and 1.54 mL of propargyl bromide solution. The reaction was quenched with 25 mL of sat. NH₄Cl (aq) solution and the product was isolated as a colorless liquid using 1:25 diethyl ether/ pentanes eluent in 70% yield. ¹H NMR (500 MHz, CDCl₃) δ 5.93 (s, 1H), δ 5.01 (s, 1H), δ 4.86 (s, 1H), δ 4.13 (d, 2.4 Hz, 2H), δ 3.99 (s, 2H), δ 2.43 (t, 2.4 Hz, 1H), δ 1.87 (s, 3H), δ 1.84 (s, 3H).

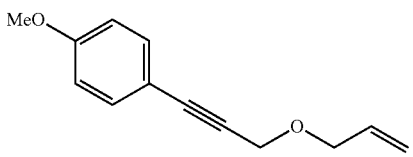

1-(3-allyloxy-prop-1-ynyl)-4-methoxy-benzene (18h): Alkyne 18h was prepared via literature precedent from the corresponding alcohol and allyl bromide using a literature precedent.[5]

Intramolecular Substrates

The vinyl boronic esters were prepared via hydroboration of the alkyne precursors via the following procedures:

Procedure 1: Schwartz's Reagent Cp$_2$ZrHCl 27 (5 mol %) was slurried with DCM in an oven-dried Schlenk tube with stir bar under an atmosphere of nitrogen. The terminal alkyne (1 eq) dissolved in DCM was added followed by HBpin (1-4 eq). The reaction was then set to stir at 35° C. and monitored by TLC. An additional 1-2 eq. of HBpin was added if the rate of reaction was slow. Following completion, the reaction was quenched with methanol. The reaction mixture was transferred to a round-bottom flask and concentrated in vacuo. The crude was then purified by column chromatography.

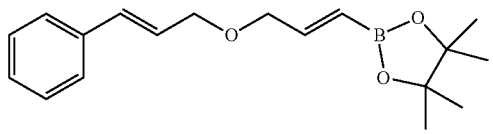 [SMILES: CC1(C)OB(/C=C/COC/C=C/c2ccccc2)OC1(C)C]

2-((E)-3-(cinnamyloxy)prop-1-en-1-yl)-4,4,5,5-tetramethyl-1,3,2-dioxaborolane (10s): Prepared using a modification of a procedure by Nelson.[12] Into a Schlenk tube was placed Cp$_2$Zr(H)(Cl) (0.1310 g, 0.508 mmol) to this was added (the alkene) (2.580 g, 14.98 mmol) in 5 mL DCM. The solution was stirred and HBPin (2.4 mL) was added dropwise. The reaction mixture was heated to 38° C. The reaction mixture was cooled to rt and concentrated. A gradient column (12:1 hexanes: EtOAc to EtOAc) afforded the light yellow oil (2.5474 g, 8.49 mmol, 57%). $^1$H NMR (400 MHz, CDCl$_3$) δ 7.38 (dt, J=7.58, 1.51 Hz, 2H), δ 7.31 (tt, J=8.33, 1.90 Hz, 2H), δ 7.23 (tt, 6.74, 1.31 Hz, 1H), δ 6.68 (dt, J=18.36, 5.71 Hz, 1H), δ 6.61 (dt, J=15.90, 1.36 Hz, 1H), δ 6.28 (dt 15.92, 5.92 Hz, 1H), δ 5.75 (dt, J=18.01, 1.66 Hz, 1H), δ 4.16 (dd, J=5.93, 1.54, 2H), 4.12 (dd, J=4.13, 1.80 Hz, 2H), δ 1.27 (s, 12H).

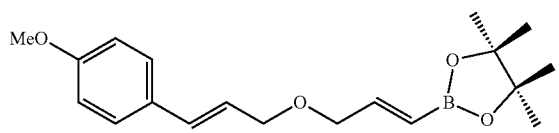

2-((E)-3-(((E)-3-(4-methoxyphenyl)allyl)oxy)prop-1-en-1yl)-4,4,5,5-tetramethyl-1,3,2-dioxaborolane (11s): Prepared using procedure 1 using 63.2 mg of 27 slurried in 0.8 mL of DCM and 724.6 mg of alkyne 11s dissolved in 3.72 mL of DCM and 0.57 mL of HBpin. The reaction was run for 48 h, with addition of 0.2 mL of HBpin at the half point. The product was isolated using a 1.5:10 ethyl acetate/hexanes eluent on silica gel, giving 11s in 45% yield as a colorless oil. $^1$HNMR (500 MHz CDCl$_3$) δ 7.32 (d, 8.7 Hz, 2H), 6.85 (d, 8.7 Hz, 2H), 6.67 (dt, 18.2, 4.7 Hz, 1H), 6.55 (d, 15.9 Hz, 1H), 6.15 (dt, 15.9, 6.1 Hz, 1H), 5.74 (dt, 18.2, 1.8 Hz, 1H), 4.14 (dd, 6.1, 1.5 Hz, 2H), 4.11 (dd, 4.8, 1.8 Hz, 2H), 3.81 (s, 2H), 1.27 (s, 12H); $^{13}$C NMR (125 MHz, CDCl$_3$) δ 159.24, 149.23, 132.05, 129.52, 127.67, 123.70, 113.94, 83.26, 71.57, 71.09, 55.28, 24.77.

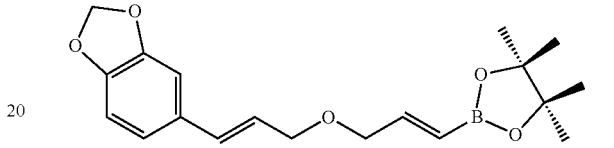

2-((E)-3-(((E)-3-(benzo[d][1,3]dioxol-5-yl) allyl)oxy) prop-1-en1-yl)-4,4,5,5-tetramethyl-1,3,2-dioxaborolane (12s): Prepared using procedure 1 using 42.7 mg of 27 slurried in 0.7 mL of DCM and 715.5 mg of alkyne 12 dissolved in 3.42 mL of DCM and 0.53 mL of HBpin. The reaction was run for 48 h, with addition of 0.53 mL of HBpin at the half point. The product was isolated using a 2:10 ethyl acetate/hexanes eluent on silica gel, giving 11s in 73% yield as a colorless oil. $^1$H-NMR (500 MHz CDCl$_3$) ABX Pattern: δ 6.92 (X, 1.6 Hz, 1H), δ 6.81 (A, 8.0, 1.6 Hz, 1H), δ 6.75 (B, 18.1, 8.0 Hz, 1H), δ 6.67 (dt, 18.1, 4.7 Hz, 1H), δ 6.52 (dt, 16, 1.3 Hz, 1H), δ 6.11 (dt, 15.8, 6 Hz, 1H), δ 5.95 (s, 1H), δ 5.73 (dt, 18.3, 1.6, 1H), δ4.13 (dd, 6.0, 1.5 Hz, 2H), δ 4.10 (dd, 4.7, 1.7 Hz, 2H), δ 1.27 (s, 6H); $^{13}$C-NMR (100 MHz CDCl$_3$) δ 149.16, 147.96, 147.24, 132.07, 131.23, 124.16, 121.17, 108.24, 105.78, 101.04, 83.27, 71.64, 70.91, 24.77.

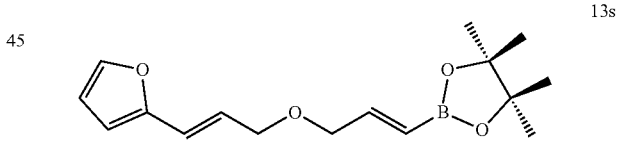

2-((E)-3(((E)-3-(furan-2-yl)allyl)oxy) prop-1-en-1-yl)-4,4,5,5tetramethyl-1,3,2-dioxaborolane (13s): Prepared using procedure 1 using 22.3 mg of 27 slurried in 0.5 mL of DCM and 193.5 mg of alkyne 13h dissolved in 2 mL of DCM and 0.26 mL of HBpin. The reaction was run for 36 h, with addition of 0.17 mL of HBpin at 22 h. The product was isolated using a 1:10 ethyl acetate/hexanes eluent on silica gel, giving 13s in 54% yield as a colorless oil. $^1$H-NMR (500 MHz CDCl$_3$) δ 7.34 (d, 1.6 Hz, 1H), δ 6.66 (dt, 18.2, 4.7 Hz, 1H), δ 6.44 (dt, 15.9, 1.4 Hz, 1H), δ 6.36 (dd, 3.3, 1.8 Hz, 1H), δ 6.23 (d, 3.1 Hz, 1H) δ 6.20 (dt, 16.0, 5.7 Hz, 1H), δ 5.74 (dt, 18.2, 1.7 Hz, 1H) δ 4.13 (dd, 5.7, 1.4 Hz, 2H) δ4.11 (dd, 4.7, 1.8 Hz, 2H), δ 1.27 (s, 12H); $^{13}$C-NMR (100 MHz, CDCl$_3$) δ 152.45, 149.09, 141.94, 124.66, 120.25, 111.20, 107.87, 83.27, 71.64, 70.32, 24.77; $^{11}$B-NMR δ 29.8; MS [M+NH$_4$]$^+$ Calc. 308.2031 Observed 308.2025.

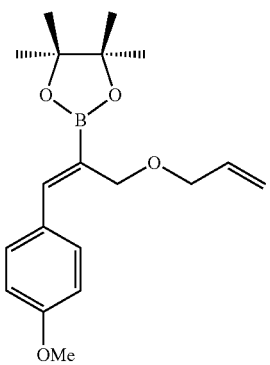

14s (Z)-2-(3-(allyloxy)-1-(4-methoxyphenyl)prop-1-en-2-yl)-4,4,5,5-tetramethyl-1,3,2-dioxaborolane (14s): A screw-capped vial with stir bar was charged with CuCl (10 mol %, 8.6 mg), NaO'Bu (15 mol %, 12.7 mg), B₂pin₂ (1.1 eq., 246.2 mg), PCy₃ (12 mol %, 29.6 mg). The vial was capped with a septum, then purged and back-filled with nitrogen three times. Then alkyne 14h (178 mg) dissolved in 1.35 mL of toluene was added, causing the solution to turn dark purple. Subsequent addition of methanol (74 μL) caused the solution to turn an orange-bronze color. The progress of the reaction was then monitored by TLC. The reaction was complete by 30 min, at which point the reaction mixture was quenched via addition of excess methanol. The mixture was then filtered through a pad of celite (washed with DCM) and the filtrate concentrated to dryness. The obtained crude was purified by column chromatography using a 1:10 ethyl acetate/hexanes eluent on silica gel. The product was obtained as an inseparable mixture of isomers in a ratio of 10:1 which was then used in the cycloaddition. ¹H-NMR (500 MHz CDCl₃) δ 7.43 (d, 9.5 Hz, 2H), δ 7.39 (s, 1H), δ 6.88 (d, 8.3 Hz, 2H), δ 5.97 (ddt, 17.0, 10.5, 5.5 Hz, 1H) δ 5.29 (dq, 17.4, 1.4 Hz, 2H), δ 5.15 (dq, 10.4, 1.4 Hz, 2H), δ 3.82 (s, 3H), δ 1.31 (s, 12H).

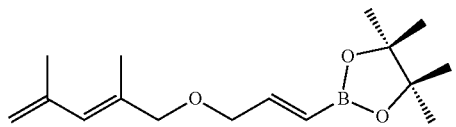

15s

16s 4,4,5,5-tetramethyl-2((E)-3-(((E)-5-methylhexa-2,4-dien-1yl) oxy)prop-1-en-1-yl)-1,3,2-dioxaborolane (15s): Prepared using procedure 1 using 46 mg of 27 slurried in 1.2 mL of DCM and 398.2 mg of alkyne 15h dissolved in 4 mL of DCM and 0.57 mL of HBpin. The reaction was run for 24 h. The product was isolated using a 13:87 diethyl ether/hexanes eluent on silica gel, giving 15s in 30% yield as a colorless oil. ¹H-NMR (500 MHz CDCl₃) δ 6.65 (dt, 17.2, 5.5 Hz, 1H), δ 6.44 (dd, 14.7, 11.0 Hz, 1H), δ 5.83 (d, 10.9 Hz, 1H), δ 5.71 (dt, 17.9, 1.5 Hz, 1H), δ 5.62 (dt, 4.7, 1.7 Hz, 1H), δ 4.06 (dd, 18.3, 5.1 Hz, 1H), δ 4.03 (d, 6.4 Hz, 1H), δ 1.78 (s, 3H), δ 1.76 (s, 3H), δ 1.27 (s, 12H).

4,4,5,5-tetramethyl-2-((E)-3-(((E)-4-methylpenta-2,4-dien-1yl)oxy)prop-1-en-1-yl)-1,3,2-dioxaborolane (16s): Prepared using a modified version of procedure 1. Catalyst 27 22.3 mg of was slurried in 0.2 mL of DCM and a sample of alkyne 16h (~0.96 mmol) dissolved in 5 mL of diethyl ether and 0.16 mL of HBpin. The reaction was run for 36 h. The product was isolated using a 1:10 ethyl acetate/hexanes eluent on silica gel, giving 16s in 23% yield as a colorless oil. ¹H-NMR (500 MHz CDCl₃) δ 6.65 (dt, 18.2, 4.6 Hz, 1H), δ 6.34 (d, 15.9 Hz, 1H), δ 5.73 (dt, 15.5, 6.2 Hz, 1H), δ 5.72 (dt, 18.0, 1.8 Hz, 1H), δ 4.97 (s, 2H), δ 4.07 (dd, 4.8, 1.8 Hz, 2H), δ 4.06 (dd, 4.5, 1.4 Hz, 2H), δ 1.85 (s, 3H), δ 1.27 (s, 12H).

17s 2-((E)-3-(((E)-2,4-dimethylpenta-2,4-dien-1-yl)oxy) prop-1-en-1-yl) 4,4,5,5-tetramethyl-1,3,2-dioxaborolane (17s): Prepared using procedure 1 using 53.5 mg of 27 slurried in 0.2 mL of DCM and 162.4 mg of alkyne 17h dissolved in 0.1 mL of DCM and 0.17 mL of HBpin. The reaction was run for 36 h. The product was isolated using a 1:20 diethyl ether/pentane eluent on silica gel, giving 17s in 24% yield as a colorless oil. 1 H-NMR (500 MHz CDCl₃) δ 6.66 (dt, 18.3, 5.1 Hz, 1H), δ 5.90 (s, 1H), δ 5.72 (dt, 18.1, 1.8 Hz, 1H), δ 4.99 (t, 1.5 Hz, 1H), δ 4.84 (s, 1H), δ 4.04 (dd, 4.7, 1.8 Hz, 2H), δ 3.91 (s, 2H), δ 1.86 (s, 3H), δ 1.82 (d, 1.2 Hz, 3H), δ 1.27 (s, 12H); ¹³C NMR (125 MHz, CDCl₃) δ 149.36, 141.49, 133.71, 128.80, 115.18, 83.26, 76.66, 71.30, 24.78, 23.51, 15.47.

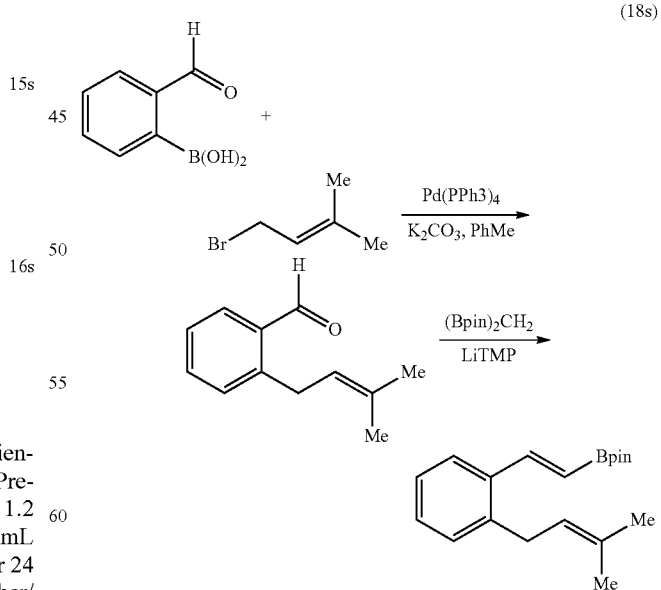

(18s)

2-(3-methylbut-2-en-1-yl)benzaldehyde: An oven dried 100 mL round bottom flask was charged with Pd(PPh₃)₄ (134 mg, 0.0999 mmol, 0.03 equiv.), (2-formylphenyl)boronic acid (500 mg, 3.33 mmol, 1.33 equiv.), 1-bromo-3-methylbut-2-ene (0.29 mL, 2.50 mmol, 1.0 equiv.) $K_2CO_3$ (4.13 g, 30.0 mmol, 12 equiv.), and toluene (66 mL, 0.0379 M) before fitting with a reflux condenser, purging with $N_2$, and bringing to a reflux for 16 h. The reaction was allowed to cool to room temperature and filtering through a Celite plug, washing the plug twice with toluene before concentrating in vacuo. The crude material was purified by flash column chromatography in 98:2 hexanes:EtOAc to yield 250 mg (57% yield) of the product as a clear oil. $^1$H NMR: (500.2 MHz, $CDCl_3$) δ 10.21 (s, 1H), 7.76 (dd, J=7.7, 1.4 Hz, 1H), 7.43 (t, J=7.5 Hz, 1H), 7.28 (t, J=7.5 Hz, 1H), 7.23 (d, J=7.6 Hz, 1H), 5.20 (tt, J=7.2, 1.6 Hz, 1H), 3.69 (d, J=7.0 Hz, 2H), 1.66 (s, 2H), 1.66 (s, 3H); $^{13}$C NMR: (125.8 MHz, $CDCl_3$) δ 192.61, 144.59, 134.05, 133.90, 133.20, 131.32, 130.63, 126.61, 122.78, 31.34, 25.84, 18.12; HRMS (ASAP) calculated for $[C_{12}H_{14}O+H]^+$ requires 175.1117 m/z, found 175.1118 m/z.

(E)-4,4,5,5-tetramethyl-2-(2-(3methylbut-2-en-1-yl) styryl)-1,3,2-dioxaborolane (18s): Prepared according to a modified procedure of Morken.[13] A dry 25 mL Schlenk tube was charged with 2,2,6,6-tetramethyl piperidine (0.16 mL, 0.931 mmol, 1.2 equiv.) and THF (0.9 mL) under positive $N_2$ pressure. The vessel was cooled to 0° C. and n-BuLi (0.44 mL, 2.13 M in hexanes, 0.931 mmol, 1.2 equiv.) was added dropwise. The reaction was allowed to stir at 0° C. for 30 min before adding a solution of bis[(pinacolato)boryl]methane (250 mg, 0.931 mmol, 1.2 equiv.) in THF (2 mL) dropwise. After stirring at 0° C. for 5 min, the vessel was cooled to −78° C. and a solution 2-(3-methylbut-2-en-1-yl) benzaldehyde (135 mg, 0.776 mmol, 1.0 equiv.) in THF (1 mL) was added dropwise. After the addition was complete, the reaction was allowed to stir at −78° C. for 4 h before warming to room temperature and concentrating in vacuo. The crude material was purified by passing through a short plug of silica gel in 95:5 hexanes:EtOAc to give 186 mg (67% yield) of the desired product as a light yellow oil. $^1$H NMR: (500.2 MHz, $CDCl_3$) δ 7.69 (d, J=18.2 Hz, 1H), 7.55 (dd, J=7.6, 1.6 Hz, 1H), 7.24-7.14 (m, 3H), 6.05 (d, J=18.2 Hz, 1H), 5.25-5.19 (m, 1H), 3.45 (d, J=7.2 Hz, 2H), 1.76 (s, 3H), 1.73 (d, J=1.4 Hz, 3H), 1.31 (s, 13H); $^{13}$C NMR: (125.8 MHz, $CDCl_3$) δ $^{13}$C NMR (126 MHz, $CDCl_3$) δ $^{13}$C NMR (126 MHz, $CDCl_3$) δ 147.5, 140.0, 136.8, 132.4, 129.4, 128.8, 126.4, 126.2, 123.1, 83.4, 32.2, 25.9, 25.0, 18.0. The signal for the carbon attached to boron was not observed due to quadrupolar relaxation of the boron nucleus. HRMS (ESI) calculated for $[C_{19}H_{27}BO_2+H]^+$ requires 298.2213 m/z, found 298.2210 m/z.

Example 2: Preparation of Cyclobutane Boronates Via [2+2] Coupling

Unless where otherwise noted, the intramolecular cycloadditions were carried out according to the following standard procedure: A 0.05 M solution of alkenyl boronic ester with 1 mol % of photocatalyst 6 (3.9 mg) in MeCN (7 mL) was prepared. To an oven-dried Schlenk tube containing stir bar was added 6 mL of this solution. The solution in the Schlenk tube was then degassed using freeze-pump-thaw techniques (3×4 minutes). The Schlenk tube was then placed 10 cm from a 23 W CFL and irradiated until complete consumption of the starting material was observed via TLC. After complete reaction, the CFL would be turned off and the reaction transferred to a round-bottom flask. The Schlenk tube would then be rinsed with diethyl ether which would also be transferred to the round-bottom, whose contents would then be concentrated in vacuo. The product was then be purified by column chromatography.

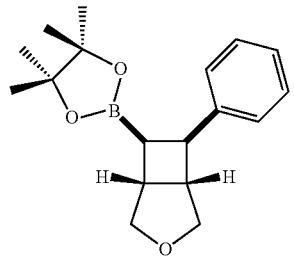

4,4,5,5-tetramethyl-2-((1S*,5R*,6S*,7R*)-7-phenyl-3-oxabicyclo [3.2.0]heptan-6-yl)-1,3,2-dioxaborolane (10): Into an oven-dried 500 mL Schlenk flask was placed 2-((E)-3-(cinnamyloxy)prop-1-en-1-yl)-4,4,5,5-tetramethyl-1,3,2-dioxaborolane (2.9967 g), $[Ir(dF(CF_3)ppy)_2(dtbbpy)](PF_6)$ (0.1131 g) and 200 mL MeCN. The solution was degassed with free-pump-thaw (4×4 min). The degassed solution was irradiated with a 20 W white lamp from 10 cm away. The reaction mixture was stirred for 48 hours and was concentrated to a creamy oil. A column was run with 9:1 hexanes: EtOAc as the eluent and afforded the major diastereomers a white crystal (1.1639 g, 3.83 mmol, 39%). $^1$H NMR (400 MHz, $CDCl_3$) δ 7.28 (dt, J=13.73, 7.59 Hz, 4H), δ 7.15 (tt, J=7.09, 1.45 Hz, 1H), δ 3.94 (dd, J=15.85, 9.53 Hz, 1H), δ 3.59 (ddd, J=9.21, 9.03, 5.36 Hz, 2H), δ 3.45 (dd, J=11.54, 5.51 Hz, 1H), δ 2.12 (dd J=11.38, 5.57 Hz, 1H), δ 0.99 (s, 6H), δ 0.86 (s, 6H).

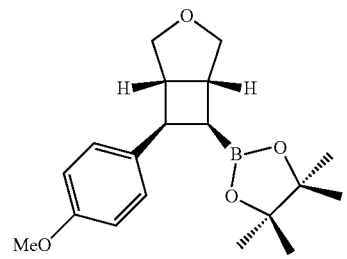

11

2-((1S*,5R*,6S*,7R*)-7-(4-methoxyphenyl)-3-oxa bicyclo[3.2.0] heptan-6yl)-4,4,5,5-tetramethyl-1,3,2-dioxaborolane (11): Prepared according to the general procedure using 106 mg of substrate 11s and an irradiation period of 17 h. The product was purified using a 2:10 ethyl acetate/hexanes eluent on silica gel and was isolated as a colorless crystalline solid. Major diastereomer: $^1$H-NMR (500 MHz $CDCl_3$) δ 7.23 (d, 8.6 Hz, 2H), δ 6.83 (d, 8.7 Hz, 2H), δ 3.94 (d, 9.2 Hz, 1H), δ 3.91 (d, 9.2 Hz, 1H), δ 3.60 (dd, 9.2, 5.5 Hz, 1H), δ 3.55 (dd, J=9.3, 5.3 Hz, 1H), δ 3.22-3.16 (m, 1H), δ 3.07 (dt, 7.8, 5.6 Hz, 1H), δ 2.08 (dd, J=11.2, 5.7 Hz, 1H), δ 1.02 (s, 6H), 0.89 (s, 6H).

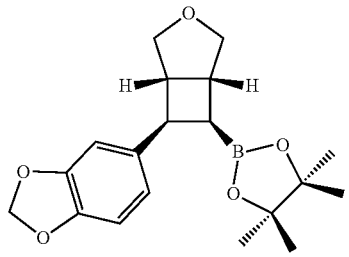

12

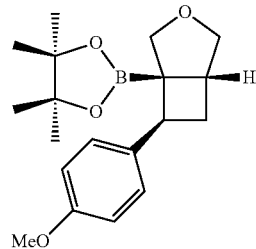

14

2-((1S*,5R*,7R*)-7-(4-methoxyphenyl)-3-oxabicyclo [3.2.0] heptan-1-yl)-4,4,5,5tetramethyl-1,3,2-dioxaborolane (14): Prepared using a scaled down version of the general procedure using 39 mg of substrate 18s, 1.4 mg of 6, 2.4 mL of MeCN and an irradiation period of 17 h using a 16 W blue lamp in place of a 23 W CFL. The yield was determined by dissolving the crude reaction mixture in chloroformd with 12.6 mg of trimethyl(phenyl)silane external standard. Major diastereomer: H-NMR (500 MHz CDCl$_3$) δ 7.18 (d, 8.8 Hz, 2H), δ 6.81 (d, 8.5 Hz, 2H), δ 4.12 (d, 9.7 Hz, 1H), δ 3.99 (d, 9.6 Hz, 1H), δ 3.88 (d, 9.2 Hz, 1H), δ 3.79 (d, 7.24 Hz, 1H), δ 3.77 (s, 3H), δ 3.88 (d, 9.2 Hz, 1H), δ 3.61 (dd, 9.4, 6.2 Hz, 1H), δ 3.46 (d, 9.4 Hz, 1H), δ 2.91 (ddd, 9.3, 5.6, 3.4 Hz, 1H), δ 2.04 (ddd, 12.67, 9.55, 3.36 Hz, 1H), δ 1.99 (s, 12H).

2-((1S*,5R*,6S*,7R*)-7-(benzo[d][1,3]dioxol-5-yl)-3-oxabicyclo [3.2.0] heptan-6-yl)-4,4,5,5-tetramethyl-1,3,2-dioxaborolane (12): Prepared according to the general procedure using 117 mg of substrate 12s and an irradiation period of 12 h. The product was purified using a 2:10 ethyl acetate/hexanes eluent on silica gel and was isolated as a colorless oil. Major diastereomer: $^1$H-NMR (500 MHz CDCl$_3$) ABX pattern: δ 6.85 (X, 1.85 Hz, 1H), δ 6.74 (A, 8.0, 1.5 Hz, 1H), δ 6.72 (B, 8.0 Hz, 1H), δ 5.90 (s, 2H) δ 3.94 (d, 9.2 Hz, 1H), δ 3.90 (d,9.6 Hz, 1H), δ 3.60 (dd, 9.3, 5.5 Hz, 1H), δ 3.54 (dd, 9.3, 5.3 Hz, 1H), δ 3.37 (dd, 11.2, 5.3 Hz, 1H), δ 3.14 (dt, 7.6, 5.5 Hz, 1H), δ 3.06 (dt, 7.6, 5.5 Hz, 1H), δ 2.07 (dd, 11.3, 5.6 Hz, 1H), δ 1.06 (s, 6H), δ 0.95 (s, 6H); $^{13}$C-NMR (100 MHz, CDCl$_3$) δ 147.43, 145.65, 138.72, 120.33, 108.18, 107.88, 100.70, 83.10, 74.99, 74.10, 44.95, 43.33, 36.67, 25.02, 24.64; $^{11}$B-NMR δ 33.9; MS [M+NH$_4$]$^+$ Calc. 362.2133 measure 362.2130.

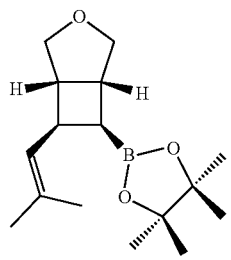

15

4,4,5,5-tetramethyl-2-((1S*,5R*,6S*,7S*)-7-(2-methyl-prop-1-en-1-yl)-3oxabicyclo[3.2.0]heptan-6-yl)-1,3,2-dioxaborolane (15): Prepared according to the general procedure using 97 mg of substrate 15s and an irradiation period of 18 h. The product was purified using an 7:13 diethyl ether/hexanes eluent on silica gel and was isolated as a colorless oil. Major diastereomer: $^1$H-NMR (500 MHz CDCl$_3$) δ 5.41 (dt, 9.7, 1.2 Hz, 1H) δ 3.88 (d, 9.4 Hz, 1H) δ 3.84 (d, 9.2 Hz, 1H), δ 3.53 (dd, 9.2, 5.6 Hz, 1H), δ 3.46 (dd, 9.2, 5.2 Hz, 1H), δ 3.01 (dt, 10.6, 5.5 Hz, 1H), δ 2.91 (dt, 7.7, 6.0 Hz, 1H), δ 2.7 (dt, 7.7, 5.5 Hz, 1H), δ 1.83 (dd, 10.7, 5.3 Hz, 1H), δ 1.61 (s, 3H), δ 1.54 (d, 1 Hz, 3H), δ 1.26 (s, 6H) δ 1.23 (s, 6H).

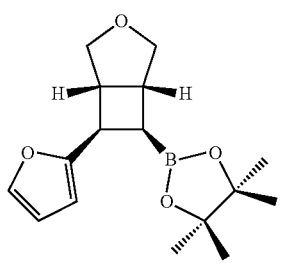

13

2-((1R*,5R*,6R*,7R*)-7-(furan-2-yl)-3-oxabicyclo [3.2.0] heptan-6-yl)-4,4,5,5tetramethyl-1,3,2-dioxaborolane (13): Prepared according to the general procedure using 102 mg of substrate 13s and an irradiation period of 9 h. The product was purified using an 2:10 ethyl acetate/hexanes eluent on silica gel and was isolated as a colorless oil Major diastereomer: $^1$H-NMR (500 MHz CDCl$_3$) δ 7.32 (dd, 1.8, 0.8 Hz, 1H), δ 6.27 (dd, 2.9, 1.7 Hz, 1H), δ 6.07 (d, 3.2 Hz, 1H), δ 3.94 (d, 9.7 Hz, 1H), δ 3.90 (d, 9.4 Hz, 1H), δ 3.56 (dd, 9.4, 5.4 Hz, 1H), δ 3.51 (dd, 9.5, 5.3 Hz, 1H) δ 3.43 (dd, 11.3, 5.3 Hz, 1H), δ 3.19 (dt, 7.8, 5.1 Hz, 1H), δ 3.09 (dt, 7.5, 5.4 Hz, 1H), δ 2.02 (dd, 11.4, 5.7 Hz, 1H), δ 1.14 (s, 6H), δ 1.07 (s, 6H); $^{13}$C-NMR (100 MHz, CDCl$_3$) δ 157.85, 140.84, 110.19, 104.93, 83.15, 75.01, 73.79, 43.76, 36.91, 36.44, 24.90, 24.77; $^{11}$B-NMR δ 33.0.

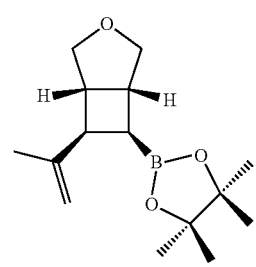

16

4,4,5,5-tetramethyl-2-((1S*,5R*,6S*,7R*)-7-(prop-1-en-2-yl)-3-oxabicyclo[3.2.0]heptan-6-yl)-1,3,2-dioxaborolane (16): Due to difficulties in synthesizing and purifying substrate 16s (see corresponding entry above) a scaled down version of the standard procedure using a slightly impure sample of the substrate was used. Only 23 mg of 16s, 1.2 mg of 6 and 2 mL MeCN were used, and the period of irradiation was 19 h. The product was purified using an 1:10 ethyl acetate/hexanes eluent on silica gel and was isolated as a colorless oil. Major diastereomer: $^1$H-NMR (500 MHz CDCl$_3$) δ 4.81 (s, 1H), δ 4.76 (s, 1H), δ 3.88 (d, 9.2 Hz, 1H), δ 3.80 (d, 9.2 Hz, 1H), δ 3.60 (dd, 9.3, 6.1 Hz, 1H), δ 3.48 (dd, 9.0, 5.0 Hz, 1H), δ 3.07 (dt, 7.4, 6.2 Hz, 1H), δ 2.89-2.79 (m, 2H), δ 1.83 (dd, 11.2, 4.8 Hz, 1H), δ 1.72 (s, 3H), δ 1.23 (s, 6H), δ 1.22 (s, 6H).

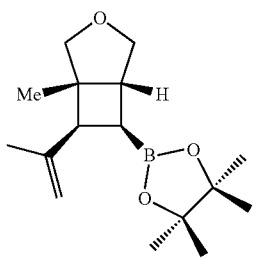

17

4,4,5,5-tetramethyl-2-((1S*,5R*,6S*,7S*)-1-methyl-7-(prop-1-en-2-yl)-3oxabicyclo[3.2.0]heptan-6-yl)-1,3,2-dioxaborolane (17): Prepared according to the general procedure using 97 mg of substrate 17s and an irradiation period of 13 h. The product was purified using an 1:10 ethyl acetate/hexanes eluent on silica gel and was isolated as a colorless oil. Major diastereomer: $^1$H-NMR (500 MHz CDCl$_3$) δ 4.85 (q, 1.0 Hz, 1H), δ 4.80 (s, 1H), δ 3.84 (d, 9.4 Hz, 1H), δ 3.80 (d, 9.10 Hz, 1H), δ 3.73 (dd, 9.4, 5.9 Hz, 1H), δ 3.23 (d, 9.8 Hz, 1H), δ 2.37 (t, 5.5 Hz, 1H), δ 1.74 (dd, 10.4, 5.0 Hz, 1H), δ 1.66 (s, 1H), δ 1.59 (m, 1H), δ 1.25 (d, 2 Hz, 12 H), δ 1.20 (s, 3H).

Example 3: Preparation of Cyclobutane Boronates Via Enantioselective [2+2] Coupling TADDOL derivatives of ((E)-3-(cinnamyloxy)prop-1-en-1-yl)boronic acid were prepared and reacted under standard conditions as described below. Results are shown in Tables 12 and 2.

TABLE 1

Results using TADDOL derivatives

| Entry | Ar | Yield | d.r. | ee |
|---|---|---|---|---|
| 1 | 4-MeO—Ph (4.23) | 85% | 9:1:1 | 37% |
| 2 | 4-Ph—Ph (4.24) | 70% | 12:1:1 | 34% |
| 3 | Ph (4.22) | 82% | 12:1:1 | 34% |
| 4 | 4-ClPh (4.25) | 77% | 12:1:1 | 28% |
| 5 | F$_5$—Ph (4.26) | N.D. | N.D. | 30% |
| 6 | 3,5-(Me)$_2$—Ph (4.27) | 75% | 5:1:1 | 18% |
| 7 | 3,5-(i-Pr)$_2$—Ph (4.28) | 95% | 3:1:1 | 22% |
| 8 | 2-naphthyl (4.29) | 35% | N.D. | 17% |
| 9 | 2-F—Ph (4.30) | 74% | 9:1:1 | 19% |
| 10 | 2-Me—Ph (4.31) | N.D. | 3:2:1 | 50% |
| 11 | 2-MeO—Ph (4.32) | — | — | — |
| 12 | 1-naphthyl (4.33) | — | — | — |

TABLE 2

Results using TADDOL backbone-modified derivatives

| Entry | R$_1$, R$_2$ | Yield$^a$ | d.r. | ee |
|---|---|---|---|---|
| 1 | H, Ph (4.34) | 55% | 15:2:1 | 31% |
| 2 | H, 1-naphthyl (4.35) | 83% | 10:1:1 | 36% |
| 3 | —CH$_2$(CH$_2$)$_3$CH$_2$— (4.36) | 61% | N.D. | 31% |
| 5 | n-Pr, n-Pr (4.37) | 37% | 9:1 | 37% |
| 6 | Ph, Ph (4.38) | 50% | 6:1:1 | 40% |

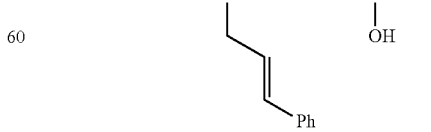

((E)-3-(cinnamyloxy)prop-1-en-1-yl)boronic acid (4.9): A 100 mL round bottom flask was charged with ammonium acetate (964 mg, 12.5 mmol, 3 equiv.), sodium periodate (2.67 g, 12.5 mmol, 3 equiv.), 2-((E)-3-(cinnamyloxy)prop-1-en-1-yl)-4,4,5,5-tetramethyl-1,3,2-dioxaborolane (1.24 g, 4.15 mmol, 1 equiv.) and a 1:1 mixture of acetone and water (50 mL, 0.083 M). The vessel was fitted with a septum and stirred for 24 at room temperature under nitrogen. The solution was filtered through a pad of Celite® with multiple washes of acetone and concentrated in vacuo to removed the organic solvent. The remaining aqueous layer was extracted with EtOAc (3×) and the combined organic layers were washed with water (3×), brine, dried over $Na_2SO_4$, and concentrated in vacuo to give the crude product as a white solid and 1:1 mixture of dehydrated species, which was used without further purification (767 mg, 85%). The mixture of products was found to be stable indefinitely if stored at 40° C. under inert atmosphere. $^1H$ NMR (500 MHz, $CDCl_3$) δ 7.40-7.38 (m, 4H), 7.33-7.30 (m, 4H), 7.26-7.27 (m, 2H), 7.01 (dt, J=17.9, 4.5 Hz, 1H), 6.65 (d, J=6.3 Hz, 1H), 6.61 (d, J=6.1 Hz, 1H), 6.57 (dt, J=18.1, 4.6 Hz, 1H), 6.33-6.27 (m, 2H), 5.85 (dt, J=17.9, 1.8 Hz, 1H), 5.73 (dt, J=18.1, 1.8 Hz, 1H), 4.30 (bs, 2H), 4.20-4.17 (m, 6H), 4.14 (dd, J=4.6, 1.8 Hz, 2H).

General procedure for triplet sensitized enantioselective [2+2] photocycloaddition: A flame dried 25 mL round bottom flask was charged with ligand (0.110 mmol, 1.1 equiv.), ((E)-3-(cinnamyloxy)prop-1-en-1-yl)boronic acid (21.8 mg, 0.100 mmol, 1.0 equiv.) and freshly activated 4 Å mol sieves (500 wt %). The vessel was fitted with an oven-dried reflux condenser and evacuated and backfilled with nitrogen (3×). Dry toluene (5 mL, 0.02 M) was added under a positive pressure of nitrogen and the solution was brought to a reflux and stirred for 16 h. After cooling to room temperature the reaction was concentrated and carried crude to the next step.

An oven dried 25 mL Schlenk flask was charged with $[Ir(dF(CF_3)ppy)_2(dtbbpy)]PF_6$[14] (1.1 mg, 0.001 mmol, 0.01 equiv.), to which the crude reaction mixture from above was quantitatively transferred in 3 portions with either $CH_2Cl_2$ or $CH_3CN$ (2 mL, 0.05 M). The vessel was sealed and degassed via three successive freeze pump thaw cycles, backfilled with nitrogen, and irradiated for 20 h. The reaction mixture was transferred to a 3 dram filled, concentrated in vacuo, and the vessel was charged with sodium perborate monohydrate (30 mg, 0.300 mmol, 3 equiv.), phenanthrene as in internal standard, and a 1:1 mixture of THF and distilled $H_2O$ (1 mL, 0.1 M). The resulting suspension was rapidly stirred for 3 h before diluting with $H_2O$ and extracting the solution with EtOAc. The organic solution was washed with brine, dried over $NaSO_4$, and concentrated in vacuo to give crude, which was purified by silica gel chromatography (73:27 pentanes:$Et_2O$) to afford 7-phenyl-3-oxabicyclo[3.2.0]heptan-6-ol as a mixture of diastereomers. The enantiomeric excess of the major diastereomer of the cyclobutanol product 4.9 was determined either by SFC analysis (Daicel CHIRALPAK® OD-H, 5% MeOH, 3 mL/min, $t_1$=6.07 min, $t_2$=6.69 min) or HPLC analysis (Daicel CHIRALPAK® OD-H, 5% iPrOH in hexanes, 1.23 mL/min, $t_1$=13.7 mL, $t_2$=15.1 min). (1S*, 5R*, 6S*, 7R*) diastereomer, (4.9-A, major) $^1H$ NMR (500 MHz, $CDCl_3$) δ 7.39-7.36 (m, 2H), 7.33-7.27 (m, 3H), 4.25-4.22 (m, 1H), 4.09 (d, J=9.4 Hz, 1H), 3.95 (d, J=9.4 Hz, 1H) 3.56 (d, 9.6 Hz, 1H), 3.55 (dd, 9.6, 1.3 Hz, 1H), 3.42 (dd, 7.5, 5.5 Hz, 1H), 3.19 (dt, J=8.4, 5.3 Hz, 1H), 2.88-2.84 (m, 1H), 1.53 (d, J=5.4 Hz, 1H). $^{13}C$ NMR (126 MHz, $CDCl_3$) δ 137.7, 128.8, 128.7, 127.0, 73.2, 72.0, 71.6, 49.3, 48.0, 41.0. HRMS (ASAP) calculated for $[C_{12}H_{14}O_2+H]$ requires m/z 191.1066, found 191.1066. (1S*, 5R*, 6R*, 7R*) diastereomer, (4.9-B, minor) $^1H$ NMR (500 MHz, $CDCl_3$) δ 7.29-7.27 (m, 5H), 4.42 (dd, J=9.9, 1.4 Hz, 1H), 3.89 (d, J=9.1 Hz, 1H), 3.61 (dd, J=9.9, 7.1 Hz, 1H), 3.50 (dd, J=9.1, 4.2 Hz, 1H), 3.13 (dt, J=7.5, 7.5 Hz, 1H), 2.99 (dd, 7.8, 6.3 Hz, 1H), 2.71 (td, J=6.8, 4.3 Hz, 1H), 2.34 (d, J=8.0 Hz). $^{13}C$ NMR (126 MHz, $CDCl_3$) δ 145.5, 128.6, 126.5, 126.5, 72.8, 70.4, 54.3, 42.7, 39.7.

Synthesis of TADDOL ligands: ((4R,5R)-2,2-dimethyl-1,3-dioxolane-4,5-diyl)bis(diphenylmethanol) (4.22) was purchased from Sigma-Aldrich. The remaining compounds were prepared using known procedures:

((4R,5R)-2,2-dimethyl-1,3-dioxolane-4,5-diyl)bis(bis(4-methoxyphenyl)methanol) (4.23)[15]

((4R,5R)-2,2-dimethyl-1,3-dioxolane-4,5-diyl)bis(di([1,1'-biphenyl]-4-yl)methanol) (4.24)[16]

((4R,5R)-2,2-dimethyl-1,3-dioxolane-4,5-diyl)bis(bis(4-chlorophenyl)methanol) (4.25)[17]

((4R,5R)-2,2-dimethyl-1,3-dioxolane-4,5-diyl)bis(bis(perfluorophenyl)methanol) (4.26)[18]

((4R,5R)-2,2-dimethyl-1,3-dioxolane-4,5-diyl)bis(bis(3,5-dimethylphenyl)methanol) (4.27)[17]

((4R,5R)-2,2-dimethyl-1,3-dioxolane-4,5-diyl)bis(bis(3,5-diisopropylphenyl)methanol) (4.28)[33]

((4R,5R)-2,2-dimethyl-1,3-dioxolane-4,5-diyl)bis(di(naphthalen-2-yl)methanol) (4.29)[19]

((4R,5R)-2,2-dimethyl-1,3-dioxolane-4,5-diyl)bis(bis(2-fluorophenyl)methanol) (4.30)[20]

((4R,5R)-2-phenyl-1,3-dioxolane-4,5-diyl)bis(diphenylmethanol) (4.34)[21]

((4R,5R)-2-(naphthalen-1-yl)-1,3-dioxolane-4,5-diyl)bis(diphenylmethanol) (4.35)[21]

((2R,3R)-1,4-dioxaspiro[4.5]decane-2,3-diyl)bis(diphenylmethanol) (4.36)[22]

((4R,5R)-2,2-diphenyl-1,3-dioxolane-4,5-diyl)bis(diphenylmethanol) (4.38)[21]

(2R,3R)-2,3-Dimethoxy-1,1,4,4-tetraphenylbutane-1,4-diol (4.39)[15]

2,2'-((4R,5R)-2,2-dimethyl-1,3-dioxolane-4,5-diyl)bis(propan-2-ol) (4.40)[23]

((4R,5S)-5-(aminodiphenylmethyl)-2,2-dimethyl-1,3-dioxolan-4-yl)diphenylmethanol (4.42)[24]

Ligands 4.31-4.33 are also known, but were found to be more cleanly prepared utilizing conditions reported by Knochel for high yielding addition of aryl Grignard reagents into hindered carbonyl species.

General procedure for the synthesis of ortho-substituted TADDOL ligands: A flame dried round bottom flask was charged with dimethyl (4R,5R)-2,2-dimethyl-1,3-dioxolane-4,5-dicarboxylate (1 equiv.) and $LaCl_3(LiCl)_2$ (2 equiv.) prepared as a 0.236 M stock solution in THF by the method of Knochel.[25] A separate flame dried round bottom flask was charged with $I_2$ (0.1 equiv), Mg (6.3 equiv), aryl bromide (6.0 equiv.) and THF (2 M) and allowed to reflux until no solid Mg remained, approximately 30-60 min. The freshly prepared Grignard reagent was transferred by syringe to the first flask and allowed to stir at room temperature overnight under nitrogen. The reaction was quenched by addition of saturated $NH_4Cl$ (aq.), extracted with EtOAc (3×), washed with brine, dried over $Na_2SO_4$ and concentrated in vacuo to give a crude solid, which was purified by chromatography on silica gel.

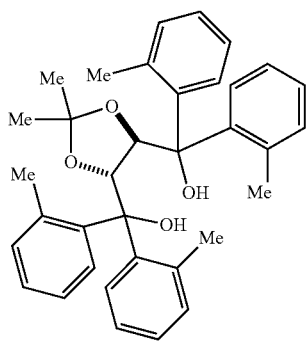

((4R,5R)-2,2-dimethyl-1,3-dioxolane-4,5-diyl)bis(di-o-tolylmethanol) (4.31): Prepared according to the General Procedure using 436 mg (4R,5R)-2,2-dimethyl-1,3-dioxolane-4,5-dicarboxylate (2.00 mmol, 1 equiv.), 17 mL LaCl$_3$(LiCl)$_2$ (0.236 M, 4.00 mmol, 2 equiv.), 50 mg I$_2$ (0.2 mmol, 0.1 equiv.), 306 mg Mg (12.6 mmol, 6.3 equiv.), and 1.44 mL o-bromotoluene (12 mmol, 6 equiv.). The crude product was purified in 9:1 hexanes:EtOAc to yield the product as a white solid (950 mg, 91% yield) with all spectra in accordance with literature reports.[26]

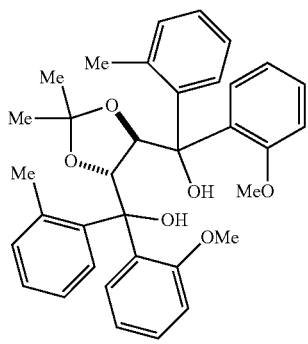

((4R,5R)-2,2-dimethyl-1,3-dioxolane-4,5-diyl)bis(bis(2-methoxyphenyl)methanol) (4.32): Prepared according to the General Procedure using 436 mg (4R,5R)-2,2-dim ethyl-1,3-dioxolane-4,5-dicarboxylate (2.00 mmol, 1 equiv.), 17 mL LaCl$_3$(LiCl)$_2$ (0.236 M, 4.00 mmol, 2 equiv.), 50 mg 12 (0.2 mmol, 0.1 equiv.), 306 mg Mg (12.6 mmol, 6.3 equiv.), and 1.39 mL o-bromoanisole (12 mmol, 6 equiv.). The crude product was purified by silica gel flash chromatography to yield the product as a white solid (759 mg, 65% yield) with all spectra in accordance with literature reports.[26]

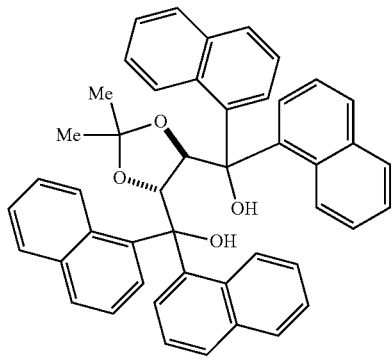

((4R,5R)-2,2-dimethyl-1,3-dioxolane-4,5-diyl)bis (di(naphthalen-1-yl)methanol) (4.33): Prepared according to the General Procedure using 436 mg (4R,5R)-2,2-dimethyl-1,3-dioxolane-4,5-dicarboxylate (2.00 mmol, 1 equiv.), 17 mL LaCl$_3$(LiCl)$_2$ (0.236 M, 4.00 mmol, 2 equiv.), 50 mg 12 (0.2 mmol, 0.1 equiv.), 306 mg Mg (12.6 mmol, 6.3 equiv.), and 1.68 mL 1-bromonaphyhalene (12 mmol, 6 equiv.). The crude product was purified by silica gel flash chromatography to yield the product as a 1:1 clathrate with EtOAc and white solid (1.33 g, 88% yield) with all spectra in accordance with literature reports.[19]

Example 4: Preparation of Cyclobutane Boronates Via Intermolecular [2+2] Coupling

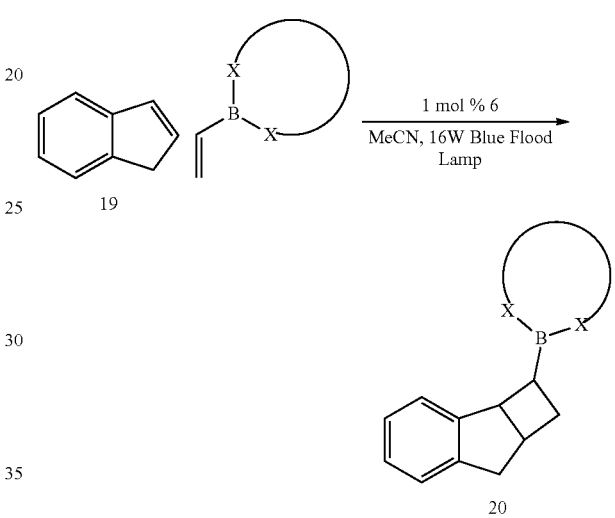

Reaction Outcome

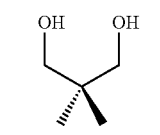

67% yield
1:0.29:0.27:00.07$^a$
75% yield
1:0.28:0.19:0.07$^b$

75% yield
1:0.37:0.14:0.02

96% yield
1:0.51:0.11:0.09

Intermolecular [2+2] Cycloaddition Procedure: The intermolecular cycloadditions were carried out according to the following standard procedure: A 0.05 M solution of indene with 1 mol % of photocatalyst 6 (1.4 mg) and 5 eq. of vinylboronic acid ester in MeCN (2.5 mL) was prepared. To an oven-dried Schlenk tube containing stir bar was added 2 mL of this solution. The solution in the Schlenk tube was then degassed using freeze-pump-thaw techniques (3×4 minutes). The Schlenk tube was then placed 10 cm from a 216 W blue flood lamp and irradiated until complete consumption of the starting material was observed via TLC. After complete reaction, the light source would be turned off and the reaction transferred to a round-bottom flask. The Schlenk tube would then be rinsed with diethyl ether which would also be transferred to the round-bottom, whose contents would then be concentrated in vacuo. The mixture would then be dissolved in chloroform-d and transferred to a vial containing a known amount of trimethyl(phenyl)silane external standard. This solution would then be transferred to an NMR tube and the yield would be determined via quantitative $^1$H-NMR using key diagnostic methyl signals in the cycloadducts. Results are shown in the scheme below. Due to the difficulty of separating the isomers, the structures were confirmed by oxidizing the boronate ester to the alcohol via sodium perborate-mediated conditions (see Example 3, compound 40) and conducting 2D $^1$H-$^{13}$C NMR (i.e., HMBC).

Example 5: Use of Cyclobutane Boronates to Prepare Functionalized Cyclobutanes

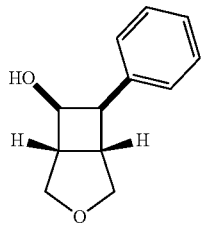 [SMILES: O[C@@H]1[C@H]2COC[C@H]2[C@@H]1c1ccccc1]

(1S*,5R*,6S*,7R*)-7-phenyl-3-oxabicyclo[3.2.0]heptan-6-ol (40): Prepared using a modification of a procedure by Sawamura.[27] Cyclobutyl boranate (0.0161 g, 0.0536 mmol) and phenanthrene (0.0048 g, 0.0269 mmol) in 0.1 mL THF was added to a small round bottom. This solution was added to 30% $H_2O_2$ (0.48 mL) and 3 M NaOH (0.048 mL). The reaction mixture was stirred for 2 h. The reaction mixture was quenched with $H_2O$ (5 mL) followed by $Na_2SO_4$. The aqueous layer was extracted with $CH_2Cl_2$ (3×5 mL), the organic layers were combined, washed with $H_2O$ (20 mL), dried with $MgSO_4$ filtered and concentrated in vacuo to afford a creamy solid (84% by internal standard). $^1$H NMR (400 MHz, CDCl$_3$) δ 7.39 (t, J=7.92 Hz, 2H), δ 7.30 (m, 3H), δ 4.26 (dd, J=7.23, 3.02 Hz, 1H), δ 4.11 (d, J=9.76 Hz, 1H), 3.97 (d, J=9.39 Hz, 1H), 3.57 (ddd, J=9.35, 5.45, 1.48 Hz, 2H), 3.44 (dd, J=7.49, 5.74 Hz, 1H), 3.20 (dt, J=8.39, 5.45 Hz, 1H), 2.88 (m, 1H), 1.53 (s, 1H).

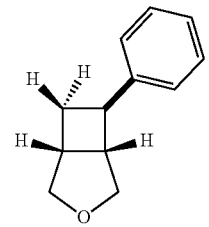

(1R*,5S*,6R*)-6-phenyl-3-oxabicyclo[3.2.0]heptane (41): Prepared using a modification of a procedure by Aggarwal.[28] Into an oven-dried vial was placed 1 (0.0154 g), TBAF.3H$_2$O (0.0193 g), Mn(OAc)$_3$.H$_2$O (0.0133 g), TBC (0.0422 g) and phenanthrene (0.0033 g) as internal standard. The vial was filled with N$_2$ and evacuated 4×. To this vial was added 0.8 mL toluene. The reaction was heated to 80° C. for ~15 hours. The reaction mixture was cooled, filtered through celite with Et$_2$O and concentrated (78% by internal standard). $^1$H NMR (400 MHz, CDCl$_3$) δ 7.33 (t, J=7.5 Hz, 2H), δ 7.26 (d, 6.78 Hz, 2H), δ 7.20 (tt, J=7.18, 1.30 Hz, 1H), δ 3.99 (dd, J=9.67, 6.67 Hz, 2H), δ 3.62 (dd, J=8.94, 5.57 Hz, 1H), δ 3.52 (dd, J=8.94, 4.84 Hz, 1H), δ 3.25 (ddd, J=16.43, 8.72, 5.03 Hz, 1H), δ 2.98 (m, 2H). δ 2.31 (dt, J=12.63, 8.57 Hz, 1H), δ 2.18 (ddd, J=13.41, 9.72, 4.06 Hz, 1H).

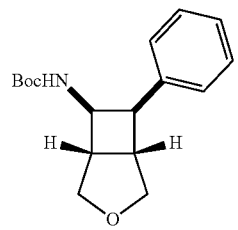 [SMILES: CC(C)(C)OC(=O)N[C@@H]1[C@H]2COC[C@H]2[C@@H]1c1ccccc1]

tert-butyl ((1S*,5S*,6S*,7R*)-7-phenyl-3-oxabicyclo[3.2.0]heptan-6-yl)carbamate (42): Prepared using a modification of a procedure by Harwig.[29] Into a dry vial was placed O-methylhhydroxylamine hydrochloride (0.011 mL) which was generated from the salt by placing the salt (2 g), DIPEA (5 mL) in glycerol (10 mL) into a round bottom and heating for 50° C. for 2 hours. It was purified by distillation with a vigreux column attached to a Schlenk tube. The O-methylhhydroxylamine hydrochloride was stored in the fridge under N$_2$. To the O-methylhhydroxylamine hydrochloride was added 0.25 mL THF. This vial was placed into a dry ice/acetone bath. To this vial was then added 2.2 M n-BuLi (0.150 mL) and stirred for 30 min. To a separate dry vial was added 1 (0.0160 g) followed by degassing by evacuating the vial and purging with N$_2$. To this was added dry THF (0.3 mL). This solution was added dropwise to the vial that was placed in the dry ice/acetone bath. The reaction was then allowed to stir at room temperature for 14 hours. The reaction mixture was observed to turn from a light yellow to a medium orange. Boc anhydride (0.0387 g) was added to the reaction mixture and the solution stirred for an additional hour. The reaction was quenched with DI H$_2$O (2.5 mL) and extracted with EtOAc (2×4 mL). The organic layers were combined, dried with Na$_2$SO$_4$ and concentrated. A mixture of products in the $^1$H NMR made characterization and determination of yield of this molecule impossible; however, the presence of distinct and new peaks in the region when cyclobutyl protons are observed was taken as an encouraging sign.

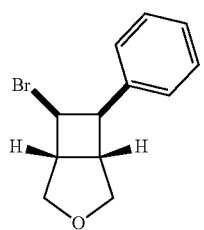

(1S*,5R*,6S*,7R*)-6-bromo-7-phenyl-3-oxabicyclo[3.2.0]heptane (43): Prepared using a modification of a procedure by Hartwig.[29] Into a dry vial was placed sparged 3,5-bis(trifluoromethyl)-1-bromobenzene (17.5 μL) and 0.25 mL THF. This solution was cooled to −78° C. and n-BuLi (0.05 mL) was added dropwise. With addition of n-BuLi the reaction mixture changed color from clear to black/brown. The solution was allowed to stire at −78° C. for 1 hour. In a separate dry vial was placed 1 (0.0148 g). This vial was purged was $N_2$ and evacuated 3×. The contents were then added dropwise to the vial of the aryllithium. This solution was stirred at −78° C. for 30 min, followed by stirring at rt for 30 min. Into a dry vial was placed recystalized NBS (0.0174 g), filled with $N_2$ and evacuated 3× and filled with 0.25 mL THF. This solution was added to the other solution. The reaction mixture was stirred for 1 hour at rt. 20% $Na_2S_2O_3$ and EtOAc were added to the reaction mixture. The aqueous layer was extracted with EtOAc, the organic layers were combined, dried with $Na_2SO_4$ and concentrated (20% calculated from phenanthrene as an external standard). $^1$H NMR (400 MHz, $CDCl_3$) δ 7.36 (tt J=7.69, 1.70 Hz, 2H), δ 7.28 (m, 2H), δ 4.68 (t, J=7.74, 1H), δ 4.52 (d, J=10.14 Hz, 1H), δ 3.97 (q, J=17.74, 8.57, 1H), δ 3.79 (dd, J=9.78, 6.94, 1H), δ 3.56 (dd, J=15.53, 7.41 Hz, 1H), δ 3.54 (dd, J=9.14, 3.59 Hz, 1H), δ 3.23 (qt J=7.24, 1.27 Hz, 1H), 3.11 (ddd, J=7.27, 6.82, 3.89 Hz, 1H).

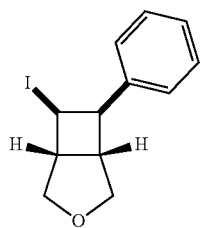 [SMILES: I[C@@H]1[C@H]2COC[C@H]2[C@@H]1c1ccccc1]

(1S*,5R*,6S*,7R*)-6-iodo-7-phenyl-3-oxabicyclo[3.2.0]heptane (44): Prepared using a modification of a procedure by Aggarwal.[30] Into an oven-dried vial was placed 1,3-bis(trifluoromethyl)-5-bromobenzene (10.4 μL), THF (0.52 mL), cooled to −78° C. In a separate oven-dried vial was added 1 (0.0153 g) in 0.26 mL THF. This solution was added dropwise to the first vial. This was stirred at −78° C. for 30 min then warmed to rt for 30 min. In a separate oven-dried vial was placed NIS (0.0144 g) in THF (0.52 mL) and this solution was added dropwise to the first vial. The solution was stirred for 1 hour at rt. 20% $Na_2S_2O_3$ and $Et_2O$ were added to the reaction mixture. The aqueous layer was extracted with $Et_2O$, the organic layers were combined, washed with brine, dried with $MgSO_4$ and concentrated 18% calculated from phenanthrene as an external standard). $^1$H NMR (400 MHz, $CDCl_3$) δ 7.36 (m, 2H), δ 7.28 (m, 3H), δ 4.81 (t, J=8.76 Hz, 1H), δ 4.36 (d, J=10.68 Hz, 1H), δ 3.97 (d, J=9.10 Hz, 1H), δ 3.89 (dd, J=9.79, 6.62 Hz, 1H), δ 3.65 (t, J=7.38 Hz, 1H), δ 3.49 (dd J=8.85, 4.22 Hz, 1H), δ 3.32 (ddd J=6.61, 4.39, 3.92 Hz, 1H), δ 3.08 (dd, J=14.45, 7.33 Hz, 1H).

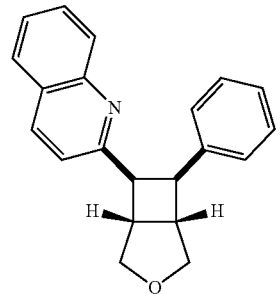 [SMILES: c1ccc([C@H]2[C@@H]3COC[C@@H]3[C@H]2c2ccc3ccccc3n2)cc1]

2-((1S*,5R*,6S*,7R*)-7-phenyl-3-oxabicyclo[3.2.0]heptan-6-yl)quinoline (45): Prepared using a modification of a procedure by Molander.[31] Into a dry Schlenk tube was charged with $Pd(OAc)_2$ (0.0010 g) and 1 (0.00208 g). The Schlenk was placed in the glovebox and charged with $Cs_2CO_3$ (0.0663 g) and n-BuPAd$_2$ (0.0030 g). The Schlenk was brought out of the glove box and in it was placed freshly distilled 3-bromoquinoline (9 μL), toluene (0.36 mL) and sparged, DI $H_2O$ (0.36 mL). The reaction mixture was heated to 100° C. for 24 hours. The reaction mixture was cooled to rt, the organic layer was separated and the aqueous phase was washed with EtOAc (3×1 mL). The organic layers were combined and concentrated (trace yield by external standard). $^1$H NMR (400 MHz, $CDCl_3$) δ 8.43 (d, J=1.99 Hz, 1H), δ 7.73 (d, J=1.44 Hz, 1H), δ 7.65 (d, J=8.31 Hz, 1H), δ 7.58 (td J=8.06, 1.23 Hz, 1H), δ 7.45 (t, J=7.34 Hz, 1H), δ 7.01 (m, 4H), δ 6.93 (tt, J=7.08, 1.42 Hz, 1H), δ 3.91 (ddd, J=25.17, 9.73, 3.24, 3H), δ 3.76 (dd, J=9.34, 3.74 Hz, 2H), δ 3.48 (q, J=7.47 Hz, 1H), δ 3.42 (m, 2H).

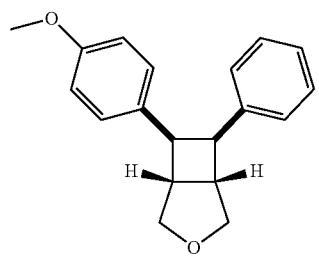 [SMILES: COc1ccc([C@@H]2[C@H]3COC[C@H]3[C@@H]2c2ccccc2)cc1]

(1S*,5R*,6S*,7R*)-6-(4-methoxyphenyl)-7-phenyl-3-oxabicyclo[3.2.0]heptane (46): Prepared using a modification of a procedure by Hartwig.[29] Into a dry vial was placed trifluoro((1S,5R,6 S,7R)-7-phenyl-3-oxabicyclo[3.2.0]heptan-6-yl)-14-borane, potassium salt (0.2070 g). The vial was placed into the glove box where $K_2CO_3$ (0.0314 g) and Pd-tBu$_3$P (0.0093 g). The septa-sealed vial was removed from the glovebox and 4-bromoanisole (10.0 μL), 0.3 mL toluene and 0.15 mL sparged, DI $H_2O$ was added to it. The septa was quickly removed and replaced with a Teflon cap sealed with parafilm. The reaction mixture was heated to 100° C. for 48 hours. The reaction mixture was then cooled to rt and was diluted with 6 mL DI $H_2O$. The aqueous layer was extracted with EtOAc (2×9 mL). The organic layers were combined, dried over $Na_2SO_4$ and concentrated (trace yield by external standard). $^1$H NMR (400 MHz, $CDCl_3$) δ 7.37 (dt, J=8.68, 2.13 Hz, 2H), δ 7.28 (m, 2H), δ 7.20 (dt, J=7.23, 1.45 Hz, 1H), δ 7.16 (dd, J=8.23, 1.44 Hz, 2H) δ 6.88 (dt, J=9.06, 1.87 Hz, 2H), δ 4.46 (d, J=9.60 Hz, 1H), δ 3.91 (dd, J=8.29, 6.25 Hz, 1H) δ 3.84 (m, 2H), 3.74 (dd, J=9.02, 5.53, 1H), δ 3.57 (dd, J=7.56, 5.53 Hz, 1H), δ 3.49 (d, J=4.80 Hz, 2H), δ 2.05 (s, 1H). $^{11}$B NMR (400 MHz, CDCl$_3$) δ 31.70 (s, 1B).

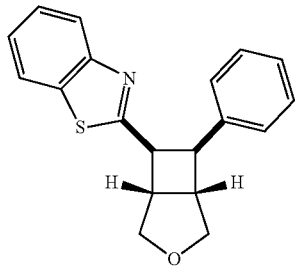 [SMILES: c1ccc([C@H]2[C@@H]3COC[C@@H]3[C@H]2c2nc3ccccc3s2)cc1]

2-((1S*,5S*,6S*,7S*)-7-phenyl-3-oxabicyclo[3.2.0] heptan-6-yl)benzo[d]thiazole (47): Prepared using a modification of a procedure by Braz.$^{32}$ Into a dry vial was placed trifluoro((1S,5R,6S,7R)-7-phenyl-3-oxabicyclo[3.2.0]heptan-6-yl)-14-borane, potassium salt (0.0200 g), Mn(III)Ac (0.0475 g). This was taken up in a 1:1 Acetic acid: H$_2$O solution (0.841 mL). To this was added benzo[d]thiazole (7.8 μL). The solution was heated to 50° C. for 18 hours. The reaction mixture was cooled to rt, and Na$_2$CO$_3$ (3.85 mL) was added to the vial. The aqeous layer was extracted with EtOAc (3×1.5 mL), the organic layers were combied and washed with DI H$_2$O (2×1.5 mL), dried with MgSO$_4$, filtered and concentrated (16% yield by external standard with phenathrene). $^1$H NMR (400 MHz, CDCl$_3$) δ 8.02 (d, J=8.92 Hz, 1H), δ 7.86 (d, J=7.55 Hz, 1H) δ 7.45 (td, J=7.13, 1.06 Hz, 1H) δ 7.37 (m, 2H), δ 7.34 (d, J=4.65 Hz, 2H), δ 7.24 (m, 2H), δ 4.08 (dd, J=9.48, 5.86 Hz, 2H), δ 3.88 (dd, J=8.86, 7.11 Hz, 1H) δ 3.76 (dd, J=10.10, 3.50 Hz, 1H), 3.57 (m, 2H), δ 3.46 (q, J=8.23 Hz, 1H), δ 3.25 (ddd, J=7.73, 7.17, 4.48 Hz, 1H).

REFERENCES

1. D. B. Huple, B. D. Mokar, R.-S. Liu, *Angew. Chem. Int. Ed. Engl.* 2015, 54, 14924-14928.
2. G. Rai, C. G. Thomas, W. Leister, D. J. Maloney *Tetrahedron Lett.,* 2009, 50, 1710-1713.
3. N. Hayashi, Y. Hirokawa, I. Shibata, M. Yasuda, A. Baba. *Org. Biomol. Chem.* 2008, 6, 1949-1954.
4. V. Gudla, R. Balamurugan. *J. Org. Chem.* 2011, 76, 9919-9933.
5. W. L. Hang, N. L. Nai, A. S. C. Chan, Y. K. Fuk, *Eur. J. Org. Chem.* 2008, 19, 3403-3406.
6. N. Shimojuh, Y. Imura, K. Moriyama, H. Togo, *Tetrahedron.* 2011, 67, 951-957.
7. J. Boyd, W. Epstein, G. Fráter. *J. Chem. Soc., Chem. Commun.,* 1976, 380-381.
8. B. DeBoef, W. R. Counts, S. R., Gilbertson. *J. Org. Chem.* 2007, 72, 799-804.
9. M. T. Crimmins, J. G. Lever, *Tetrahedron Lett.,* 1986, 27, 291-294.
10. J. Kemper, A. Studer, *Angew. Chem. Int. Ed. Engl.,* 2005, 44, 4914-4917.
11. Z. Yu, R. J. Ely, J. P. Morken, *Angew. Chem. Int. Ed. Engl.,* 2014, 53, 9632-9636.
12. B. D. Stevens, C. J. Bungard & S. G. Nelson *J. Am. Chem. Soc.,* 2006, 71, 6397-6402.
13. Coombs, J. R.; Zhang, L.; Morken, J. P. *Org. Lett.* 2015, 17, 1708.
14. Lowry, M. S.; Goldsmith, J. I.; Slinker, J. D.; Rohl, R.; Pascal, R. A.; Malliaras, G. G.; Bernhard, S. Single-Layer Electroluminescent Devices and Photoinduced Hydrogen Production from an Ionic Iridium(III) Complex. *Chem. Mater.* 2005, 17, 5712.
15. Teller, H.; Fluegge, S.; Goddard, R.; Fürstner, A. Enantioselective Gold Catalysis: Opportunities Provided by Monodentate Phosphoramidite Ligands with an Acyclic TADDOL Backbone. *Angew. Chem. Int. Ed.* 2010, 49, 1949.
16. Zou, W.; Wang, B.; Mu, H.; Zhang, H.; Song, Y.; Qu, J. Development of Tartaric Acid Derived Chiral Guanidines and Their Application to Catalytic Enantioselective α-Hydroxylation of β-Dicarbonyl Compounds. *Org. Lett.* 2013, 15, 3106.
17. Gao, X.; Han, J.; Wang, L. Design of Highly Stable Iminophosphoranes as Recyclable Organocatalysts: Application to Asymmetric Chlorinations of Oxindoles. *Org. Lett.* 2015, 17, 4596.
18. Berkessel, A.; Vormittag, S. S.; Schlörer, N. E.; Neudörfl, J. M. TEFDDOLs (A,α,α',α'-Tetrakis(perfluoroaryl/alkyl)-2,2'-dimethyl-1,3-Dioxolane-4,5-Dimethanols): Highly Fluorinated Chiral H-Bond Donors and Brønsted Acids with Distinct H-Bonding Patterns and Supramolecular Architectures. *J. Org. Chem.* 2012, 77, 10145.
19. Du, H.; Zhao, D.; Ding, K. Enantioselective Catalysis of the Hetero-Diels-Alder Reaction between Brassard's Diene and Aldehydes by Hydrogen-Bonding Activation: A One-Step Synthesis of (S)-(+)-Dihydrokawain. *Chem. Eur. 1* 2004, 10, 5964.
20. Linghu, X.; Potnick, J. R.; Johnson, J. S. Metallophosphites as Umpolung Catalysts: The Enantioselective Cross Silyl Benzoin Reaction. *J. Am. Chem. Soc.* 2004, 126, 3070.
21. Seebach, D.; Plattner, D. A.; Beck, A. K.; Wang, Y. M.; Hunziker, D.; Petter, W. On the Mechanisms of Enantioselective Reactions Using α,α,α',α'-Tetraaryl-1,3-Dioxolane-4,5-dimethanol(TADDOL)-Derived Titanates: Differences between C2- and C1-Symmetrical TADDOLs—Facts, Implications and Generalizations. *Helv. Chim. Acta* 1992, 75, 2171.
22. Zou, L.; Bao, X.; Ma, Y.; Y, S.; Qu, J.; Wang, B. Novel Tartrate-Derived Guanidine-Catalyzed Highly Enantio- and Diastereoselective Michael Addition of 3-Substituted Oxindoles to Nitroolefins. *Chem. Commum.* 2014, 50, 5760.
23. Seebach, D.; Beck, A. K.; Imwinkelried, R.; Rogo, S.; Wonnacott, A. Chiral Alkoxytitanium(IV) Complexes for Enantioselective Nucleophilic Additions to Aldehydes and as Lewis Acids in Diels-Alder Reactions. *Helv. Chem. Acta.* 1987, 70, 954.
24. Seebach, D.; Hayakawa, M.; Sakaki, J. ichi; Schweizer, W. B. Derivatives of α,α,α',α'-Tetraaryl-2,2-Dimethyl-1,3-Dioxolan-4,5-Dimethanol (TADDOL) Containing Nitrogen, Sulfur, and Phosphorus Atoms. New Ligands and Auxiliaries for Enantioselective Reactions. *Tetrahedron* 1993, 49, 1711.
25. Krasovskiy, A.; Kopp, F.; Knochel, P. Soluble Lanthanide Salts (LnCl3-2LiCl) for the Improved Addition of Organomagnesium Reagents to Carbonyl Compounds. *Angew. Chem. Int. Ed.* 2006, 45, 497.
26. Meuller, S.; Afraz, M. C.; De Gelder, R.; Ariaans, G. J. A.; Kaptein, B.; Broxterman, Q. B.; Bruggink, A. Design and Evaluation of Inclusion Resolutions, Based on Readily Available Host Compounds. *Eur. J. Org. Chem.* 2005, 6, 1082.
27. H. Ito, T. Toyoda & M. Sawamura *J. Am. Chem Soc.,* 2010, 132, 5990-5992.

28. R. Rasappan & V. K. Aggarwal *Nat. Chem.*, 2014, 6, 810-814.
29. Y. Xi & J. F. Hartwig *J. Am. Chem. Soc.*, 2016, 138, 6703-6706.
30. R. Larouche-Gauthier, T. G. Elford & V. K. Aggarwal *J. Am. Chem. Soc.*, 2011, 133, 16794-16797.
31. S. D. Dreher, P. G. Dormer, D. L. Sandrock & G. A. Molander *J. Am. Chem. Soc.*, 2008, 130, 9257-9259.
32. G. A. Molander, V. Colombel & V. A. Braz *Org. Lett*, 2011, 13, 1852-1855.
33. Coombs, J. R.; Haeffner, F.; Kliman, L. T.; Morken, J. P. Scope and Mechanism of the Pt-Catalyzed Enantioselective Diboration of Monosubstituted Alkenes. *J. Am. Chem. Soc.* 2013, 135, 11222.

EQUIVALENTS

While certain embodiments have been illustrated and described, a person with ordinary skill in the art, after reading the foregoing specification, can effect changes, substitutions of equivalents and other types of alterations to the methods, compounds and compositions thereof as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, conjugates, reagents, compounds, compositions, labeled compounds or biological systems, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:
1. A compound of Formula II, stereoisomers thereof, and/or salts of any of the foregoing:

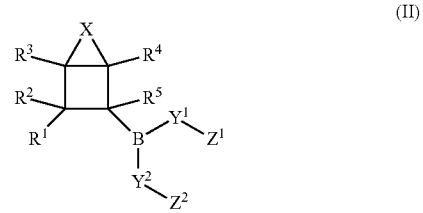

wherein
X is $-(CR^{11}_2)_n-O-(CR^{11}_2)_p-$ or $-(CR^{11}_2)_n-NR^{12}-(CR^{11}_2)_p-$, where $R^{11}$ at each occurrence is independently H or $C_{1-6}$ alkyl, $R^{12}$ is H or $C_{1-6}$ alkyl, and each of n and p is independently 1 or 2;
$Y^1$ and $Y^2$ are independently selected from O, $CR^7_2$, or $NR^7$; or $Y^1Z^1$ and $Y^2Z^2$ are both F and the boron atom forms a fluoride salt with a third fluorine atom and an alkali metal cation;
$Z^1$ and $Z^2$ are independently selected from H or a substituted or unsubstituted $C_{1-12}$ alkyl, $C_{2-12}$ alkenyl, aryl, aralkyl, heteroaryl, or heteroaralkyl group, or $Z^1$ and $Z^2$ together form Z, wherein Z is selected from a substituted or unsubstituted $C_2$-$C_{12}$ alkylene, $C_2$-$C_{12}$ heteroalkylene, or phenylene group;

R¹ is a substituted or unsubstituted alkenyl, alkynyl, aryl, or heteroaryl group;

$R^2$, $R^3$, $R^4$ and $R^5$ are each independently H or a substituted or unsubstituted alkyl group;

$R^6$ and $R^7$ at each occurrence are independently selected from H, a substituted or unsubstituted aryl or aralkyl group, or a $R^8SO_2$, $R^9OC(O)$, or $R^{10}C(O)$ group; and $R^8$, $R^9$ and $R^{10}$ at each occurrence are independently selected from a substituted or unsubstituted alkyl, aryl, or aralkyl group.

2. The compound of claim 1, wherein $Y^1$ and $Y^2$ are both O.

3. The compound of claim 1, wherein $Z^1$ and $Z^2$ together form Z which is an unsubstituted $C_2$-$C_6$ alkylene group or is —$(CH_2)_{1-2}$—NH—$(CH_2)_{1-2}$—.

4. The compound of claim 1, wherein $R^1$ is unsubstituted $C_2$-$C_6$ alkenyl.

5. The compound of claim 1, wherein $R^1$ is a substituted or unsubstituted phenyl or furanyl group.

6. The compound of claim 1, wherein $R^1$ is a $C_1$-$C_6$ alkyl group.

7. The compound of claim 1, wherein $R^2$ is H or a $C_1$-$C_6$ alkyl group.

8. The compound of claim 1, wherein $R^3$ and $R^4$ are both H.

9. The compound of claim 1, wherein $R^5$ is H or an unsubstituted $C_1$-$C_6$ alkyl group.

10. The compound of claim 1, wherein $R^8$, $R^9$ and $R^{10}$ at each occurrence are independently selected from a substituted or unsubstituted $C_{1-6}$ alkyl, phenyl, benzyl or phenethyl group.

11. The compound of claim 1, wherein $R^8$, $R^9$ and $R^{10}$ at each occurrence are independently selected from an unsubstituted $C_{1-6}$ alkyl, phenyl, benzyl or phenethyl group.

12. The compound of claim 1, wherein one or both $Y^1$ and $Y^2$ are $NR^7$, wherein $R^7$ is phenyl, benzyl, or $R^8SO_2$.

13. The compound of claim 1, wherein $Y^1$ and $Y^2$ are both $CR^7_2$.

14. The compound of claim 1, wherein $Y^1$ and $Y^2$ are both $CH_2$.

15. The compound of claim 1, wherein $Z^1$ and $Z^2$ are independently H or $C_{1-6}$ alkyl.

16. The compound of claim 1, wherein $Y^1$ and $Y^2$ are both O and $Z^1$ and $Z^2$ are independently H or $C_{1-6}$ alkyl.

17. The compound of claim 1, wherein $Y^1$ and $Y^2$ are both $CR^7_2$ and $Z^1$ and $Z^2$ are independently $C_{1-6}$ alkyl.

18. The compound of claim 1, wherein the compound of Formula II has the structure of Formula IIA:

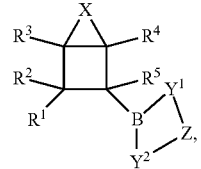

(IIA)

wherein Z is a substituted or unsubstituted $C_2$-$C_6$ alkylene, $C_2$-$C_6$ heteroalkylene or phenylene group.

19. The compound of claim 18, wherein $R^3$ and $R^4$ are both H.

20. The compound of claim 18, wherein $R^5$ is H or an unsubstituted $C_1$-$C_6$ alkyl group.

21. The compound of claim 1, wherein X is —$(CR^{11}_2)_n$—O—$(CR^{11}_2)_p$—.

* * * * *